United States Patent [19]
Sato et al.

[11] Patent Number: 5,247,397
[45] Date of Patent: Sep. 21, 1993

[54] METHOD FOR MAGNETICALLY RECORDING DIGITAL VIDEO SIGNALS WITH SPECIFIED RANGES OF THE EASY AXIS AND THE BIAS MAGNETIC FIELD

[75] Inventors: Kenichi Sato; Kazunobu Chiba; Yuichi Arisaka, all of Miyagi; Toshiharu Kobayashi, Tokyo; Yukari Yamada, Miyagi, all of Japan

[73] Assignee: Sony Corporation, Tokyo, Japan

[21] Appl. No.: 781,578

[22] Filed: Oct. 23, 1991

[30] Foreign Application Priority Data

Oct. 26, 1990 [JP] Japan .................. 2-290372
Mar. 25, 1991 [JP] Japan .................. 3-084673

[51] Int. Cl.$^5$ ............................ G11B 5/86
[52] U.S. Cl. ........................ 360/17; 360/32; 360/33.1
[58] Field of Search .................. 360/16–17, 360/32, 33.1; 358/335

[56] References Cited

U.S. PATENT DOCUMENTS 4,363,038 12/1982 Fayling .................. 360/17
4,698,700 10/1987 Shirai .................. 360/17 X

FOREIGN PATENT DOCUMENTS 0208471 1/1987 European Pat. Off. .
0240025 10/1987 European Pat. Off. .

OTHER PUBLICATIONS

Patent Abstracts of Japan, vol. 6, No. 241, p. 158, Nov. 30, 1982 & JP57-138061.

Primary Examiner—W. R. Young
Attorney, Agent, or Firm—Hill, Steadman & Simpson

[57] ABSTRACT

A magnetic recording transfer method for use with the combination of a mother magnetic recording medium and a copy magnetic recording medium of a metal-deposited thin film type each. The two media are overlaid so that the column inclination of one medium will be opposite in direction to that of the other medium. This method comprises the step of externally applying a biased magnetic field to the combination of the media in such a manner that magnetized recordings on the mother medium will be transferred to the copy medium. The easy axis of the mother medium is positioned at an angle of 20°±15° with respect to the in-plane direction of the medium. The biased magnetic field is applied to the mother medium at an angle of 110°±15° with respect to the in-plane direction of the medium. This makes it possible to enhance the efficiency in transferring magnetic recording of the mother medium, especially the recordings of short wave lengths, and to minimize demagnetization of the mother medium. Furthermore, the ratio of the coercive force $H_{CM}$ of the mother medium to the coercive force $H_{CC}$ of the copy medium ($H_{CM}/H_{CC}$) is set to at most 1.5. This improves the magnetic recording transfer output of the copy medium and boosts the efficiency in the magnetic transfer of short wave magnetic recordings.

13 Claims, 16 Drawing Sheets

| | MOTHER TAPE | | | | | |
|---|---|---|---|---|---|---|
| | MATERIAL COMPOSITION | $H_{CM}$ (Oe) | $B_r$ (G) | FILM STRUCTURE ($\delta$(μm)) | ENERGY PRODUCT (G·cm·Oe) | $\phi$(°) |
| COMBINATION 5 | Co 100% | 1850 | 3900 | DOUBLE LAYER (0.2) | 144 | 22 |
| 6 | Co 100% | 1500 | 4050 | DOUBLE LAYER (0.22) | 134 | 25 |
| 7 | Co 100% | 1500 | 4050 | DOUBLE LAYER (0.22) | 134 | 25 |
| 8 | Co 100% | 1850 | 3900 | DOUBLE LAYER (0.2) | 144 | 22 |
| 9 | $Co_{95}Ni_5$ | 1400 | 3880 | SINGLE LAYER (0.2) | 109 | 24 |
| 10 | $Co_{95}Ni_5$ | 1460 | 3850 | SINGLE LAYER (0.2) | 112 | 24 |
| 11 | Co 100% | 1620 | 4010 | DOUBLE LAYER (0.2) | 130 | 25 |
| COMPARATIVE COMBINATION | Co 100% | 1850 | 3900 | DOUBLE LAYER | 144 | 22 |

| FIG.19A | FIG.19B |

FIG. 19B

| | COPY TAPE | | | | | Hcm/Hcc | TRANSFER OUTPUT (dB) |
|---|---|---|---|---|---|---|---|
| MATERIAL COMPOSITION | Hcc (Oe) | Br (G) | FILM STRUCTURE (δ(μm)) | ENERGY PRODUCT (G·cm·Oe) | φ(°) | | |
| $Co_{80}Ni_{20}$ | 1230 | 3200 | SINGLE LAYER (0.3) | 118 | 21 | 1.5 | +2.1 |
| $Co_{80}Ni_{20}$ | 1230 | 3200 | SINGLE LAYER (0.3) | 118 | 19 | 1.2 | +3.4 |
| Co 100% | 1500 | 4050 | SINGLE LAYER (0.22) | 134 | 25 | 1.0 | +6.5 |
| Co 100% | 1500 | 4050 | SINGLE LAYER (0.22) | 134 | 27 | 1.2 | +3.9 |
| $Co_{95}Ni_{5}$ | 1310 | 3410 | SINGLE LAYER (0.25) | 112 | 21 | 1.1 | +3.4 |
| $Co_{90}Ni_{10}$ | 1390 | 3450 | DOUBLE LAYER (0.25) | 120 | 23 | 1.1 | +3.6 |
| Co 100% | 1500 | 4090 | DOUBLE LAYER (0.22) | 135 | 27 | 1.1 | +6.8 |
| METAL COATED TYPE (Ba-F) | 450 | 2300 | METAL COATED TYPE | — | 90 | — | 0 |

METHOD FOR MAGNETICALLY RECORDING DIGITAL VIDEO SIGNALS WITH SPECIFIED RANGES OF THE EASY AXIS AND THE BIAS MAGNETIC FIELD

BACKGROUND OF THE INVENTION

1. Field of the Invention

The present invention relates to a magnetic recording transfer method for use with the combination of a mother magnetic recording medium and a copy magnetic recording medium of a metal-deposited thin film type each. More particularly, the invention relates to a magnetic recording transfer method suitable for transferring short wave length magnetic recordings between the so-called high band eight-millimeter format video tapes and for transferring digital video signal magnetic recordings between digital video signal tapes.

2. Description of the Related Art

In a magnetic recording bulk copying setup, large quantities of video and audio recordings are copied from their source onto magnetic recording media. Such production generally involves the use of what is known as the magnetic recording transfer method. Under this prior art method, a mother magnetic recording medium containing source recordings such as a mother tape is subjected to a biased magnetic field (i.e., transfer magnetic field). With the mother tape brought to the proximity of or contact with a copy magnetic recording medium such as a copy tape, the biased magnetic field copies the magnetic recordings from mother tape to copy tape.

One advantage of the above prior art magnetic recording transfer method is its capability to copy large quantities of recordings at high speed, hence in a short time.

Conventionally, the coercive force $H_C$ of the mother magnetic recording medium is held at about 2.5 times the coercive force $H_C$ of the copy magnetic recording medium. This measure is taken to minimize the demagnetization of the mother magnetic recording medium by the biased magnetic field and to make the transfer of recordings to the copy magnetic recording medium easier.

However, with such a high coercive force, the mother magnetic recording medium still has difficulty in eliminating the incidence of its demagnetization. One drawback of the conventionally used, metal-coated magnetic recording media is that they tend to deteriorate in the reproduction output of short wave length magnetic recordings that were placed thereon for high density recording. For example, assume that today's best material as the metal-coated magnetic tape (e.g., high coercive force metal-coated tape) is used as the mother tape in combination with a Ba-Fe tape as the copy tape. According to past tests and measurements, those eight-millimeter format video tapes of the above type which contain recordings in a short wave length range of 0.7 μm ($=\lambda$; recording wave length) generally yield a magnetic transfer output appreciably inferior to that of metal-deposited thin film type magnetic tapes.

Japanese Patent Laid-Open No. 57-138061 discloses a magnetic copying method for use with the combination of a master (i.e., mother) magnetic recording medium and a slave (i.e., copy) magnetic recording medium positioned opposite to each other for magnetic copying of recordings therebetween. Under this method, as shown in the schematic cross-sectional view of FIG. 21, the magnetic layer surface 4 of each magnetic recording medium is measured for residual magnetism in two directions A and B. Direction A is at 45° with respect to the plane direction identified by the X axis, while direction B is at −45° relative to the same plane direction. The residual magnetism of the mother magnetic recording medium 1 measured in direction B is at least 25% greater than that measured in direction A. The residual magnetism of the copy magnetic recording medium 2 measured in direction A is at least 25% greater than that in direction B. With the two media positioned as indicated, a biased magnetic field $H_B$ is applied in or approximately in direction A for magnetic copying.

The above magnetic copying method is used in connection with the magnetic layer of the medium made of a diagonally deposited magnetic metal. On the mother magnetic recording medium 1, the biased magnetic field $H_B$ is applied in the direction of its hard axis; on the copy magnetic recording medium 2, the biased magnetic field $H_B$ is applied in the direction of its easy axis. This scheme appears to make the mother magnetic recording medium 1 highly immune to demagnetization even if the coercive force thereof is relatively small. That in turn appears to make it possible to apply a sufficiently high level of biased magnetic field $H_B$ to the mother medium for enhanced copying efficiency.

However, the magnetic copying method disclosed in Japanese Patent Laid-Open No. 57-138061 has turned out to have some disadvantages regarding demagnetization of the mother magnetic recording medium during copying and regarding the efficiency in copying.

According to the invention disclosed in Japanese Patent Laid-Open No. 57-138061, the biased magnetic field $H_B$ is applied in direction A, i.e., at 45° with respect to the in-plane direction of the magnetic recording medium. Direction A is supposed to coincide with the hard axis for the mother magnetic recording medium and with the easy axis for the copy magnetic recording medium. In fact, however, the easy axis for the copy medium is not formed in the 45° direction.

Metal-deposited thin film magnetic recording media are generally formed as follows: The substrate of a magnetic recording medium, i.e., a long sheet of a non-magnetic base is led onto the cylindrical surface of a guide drum. In this state, a magnetic metal material is deposited from a deposition source onto the base within an angular range of 90° to 40°. Magnetic growth grains resulting from deposition, or the so-called columns, are formed at about 45° with respect to the medium surface. However, even when the columns are formed with the 45° inclination, the fact that a strong diamagnetic force is exerted perpendicularly to the metal-deposited thin film medium causes the magnetizing vector to incline less in the crystallizing direction (i.e., column-growing direction) than in the in-plane direction. Thus the actual easy axis is not aligned precisely with the 45° direction. When the biased magnetic field $H_B$ is applied in the −45° direction as described, the direction of magnetic field application is not aligned with the hard axis of the mother magnetic recording medium or with the easy axis of the copy magnetic recording medium. As a result, it is impossible to obtain a satisfactory reduction of the demagnetizing effect on the mother magnetic recording medium or a high enough increase in magnetic copying output. In practice, where magnetic recordings are transferred from one medium to another within a short wave length range of about 0.7 μm as described above, there is a possibility of promoting demagnetization of the mother magnetic recording medium or of reducing the efficiency in magnetic recording transfer.

There are two kinds of digital VTRs (video tape recorders) for today's broadcast use: the D1 format component type digital VTR and the D2 format composite type digital VTR. These VTRs operate on the method of recording digitized color video signals onto a recording medium such as magnetic tapes.

The D1 format digital VTR converts a luminance signal and color difference signals (first and second) from analog to digital format at sampling frequencies of 13.5 MHz and 6.75 MHz, respectively, and records the digital format signals onto a magnetic tape after subjecting them to necessary signal processing. Because the sampling frequencies for the component luminance signal, first color difference signal and second color difference signal are 4:2:2 in ratio, this VTR is also called the 4:2:2 system.

The D2 format digital VTR converts composite color video signals from analog to digital format at a sampling frequency four times the color subcarrier signal frequency $f_{sc}$, and records the digital format signals onto a magnetic tape after subjecting them to necessary signal processing.

Since these VTRs are primarily designed for use by broadcasting stations, the highest priority of the VTR facility is the quality of broadcast pictures. When digital color video signals are recorded, each sample thereof is illustratively converted to eight bits with no substantial data compression taking place.

As an example, the amount of data handled by the D1 format digital VTR is discussed below.

When color video signals are converted from analog to digital format at the above-mentioned sampling frequencies, eight bits processed together per sample, the amount of the color video signal information involved is about 216 Mbps (megabits per second). With the horizontal and vertical blanking period data excluded, the effective pixel count per horizontal period is 720 for the luminance signal and 360 for the color difference signals. With the NTSC system (525/60) in use, the effective scanning line count per field is 250. Thus the video signal data amount Dv per second is $$D_v = (720 + 360 + 360) \times 8 \times 250 \times 60$$
$$= 172.8 \text{ Mbps}$$

With the PAL system (625/50) in use, the effective scanning line count per field is 300 and the field count per second is 50. It can be seen from this that the PAL system handles the same amount of data as the NTSC system. When redundant data components are added for error correction and formatting purposes, the overall bit rate of video data amounts to about 205.8 Mbps.

Audio data Da totals up to about 12.8 Mbps. Additional data Do such as gaps, preambles and postambles for editing purposes amounts to about 6.6 Mbps. Thus the NTSC system has the total amount of recording data Dt totaled up to $$D_t = D_v + D_a + D_o$$
$$= 172.8 + 12.8 + 6.6 = 192.2 \text{ Mbps}$$

To record the above data amount, the D1 format digital VTR utilizes 10 tracks per field when working with the NTSC system and 12 tracks per field with the PAL system (segment scheme).

The recording tape in present use is 19 mm wide. The tape comes in two thicknesses: 13 $\mu$m and 16 $\mu$m. There are three different cassettes to accommodate the tapes: large type, medium type and small type. When the data is recorded in the above-described format on the tape, the data recording density thereon is approximately 20.4 $\mu$m$^2$ per bit.

With the above-described parameters taken into account, the reproduction times of the respective cassettes run by the D1 format digital VTR are: 13 and 11 minutes for tape thicknesses of 13 and 16 $\mu$m respectively with the small size cassette; 42 and 34 minutes for tape thicknesses of 13 and 16 $\mu$m respectively with the medium size cassette; and 94 and 76 minutes for tape thicknesses of 13 and 16 $\mu$m respectively with the large size cassette.

As described, the D1 format digital VTR offers sufficient capabilities for broadcast use with the highest emphasis on picture quality. However, this VTR has its share of disadvantages, one of which is a short reproduction time. The large size cassette containing a 19-mm wide tape reel provides only about 1.5 hours of reproduction when run by the D1 format VTR. This makes it difficult to adapt this VTR to household use.

On the other hand, if signals of wave lengths as short as 0.5 $\mu$m are recorded on a track 5 $\mu$m wide, a recording density of 1.25 $\mu$m$^2$ per bit is achieved. Thus if the recording operation is performed in conjunction with a suitable data compression method that compresses recording data with minimum reproduction distortion, long-hour recording and reproduction are available even with tapes whose width is eight millimeters or less.

However, because the recording wave length is shortened to 0.5 $\mu$m for higher recording density, transferring magnetic recordings from the mother tape to the copy tape results in a very low level of transfer output on the copy tape side. For this reason, it is difficult to reproduce in large quantities digital VTR copy tapes that are required to provide high output levels.

SUMMARY OF THE INVENTION

In this specification, the in-plane direction of the magnetic recording medium is used as the reference X axis with respect to which all angular positions are determined, including the direction of the easy axis, the angle of the hard axis and the direction of biased magnetic field application.

It is an object of the present invention to provide a magnetic recording transfer method which ensures high efficiency in the transfer of magnetic recordings within the above-mentioned short wave length range, and which provides the copy magnetic recording medium upon transfer with excellent magnetic properties and high magnetic recording reproduction efficiency.

It is another object of the present invention to provide a method for magnetically recording digital video signals whereby large quantities of a digital VTR tape are copied at high speed through magnetic recording transfer onto a copy magnetic recording medium with a high transfer output.

According to a first aspect of the invention and as shown in FIG. 1, there is provided a magnetic recording transfer method for use with the combination of a mother magnetic recording medium 1 and a copy magnetic recording medium 2 of a metal-deposited thin film type each, the two media being overlaid so that the inclination of columns 3 of one medium will be opposite in direction to that of the other medium, the method comprising the step of externally applying a biased magnetic field $H_B$ to the combination of the media in such a manner that magnetized recordings on the mother magnetic recording medium 1 will be transferred to the copy magnetic recording medium 2; wherein the easy axis of the mother magnetic recording medium 1 is positioned at an angle of 20°±15° with respect to the in-plane direction of the medium; and wherein the biased magnetic field $H_B$ is applied to the mother magnetic recording medium 1 at an angle of 110°±15° with respect to the in-plane direction of the medium.

According to a second aspect of the invention, there is provided a magnetic recording transfer method wherein the ratio of the coercive force $H_{CM}$ of the mother magnetic recording medium 1 to the coercive force $H_{CC}$ of the copy magnetic recording medium 2 satisfies the condition of $$H_{CM}/H_{CC} \leq 1.5$$

According to a third aspect of the invention, there is provided a method for magnetically recording digital video signals, the method comprising the steps of converting input digital video signals into blocks made of a plurality of pixel data each; compression-coding the blocks of pixel data block by block; converting the compression-coded data into channel-encoded data; and having magnetic heads of a rotary drum record the channel-encoded data onto magnetic recording media; wherein the magnetic recording media are each constituted by a nonmagnetic base overlaid with a magnetic layer made of a magnetic metal thin film, the magnetic layer having an energy product of at least 100 G·cm·Oe given by multiplying the residual magnetic flux density, thickness and coercive force of the magnetic layer; and wherein the magnetic recording media are each constituted by a nonmagnetic base overlaid with a magnetic layer made of a magnetic metal thin film, the magnetic recording media being composed of a mother medium and a copy medium, the magnetic layer of the mother medium being brought to close proximity of the magnetic layer of the copy medium in such a manner that the inclination of columns on the magnetic layer of the mother medium is opposite in direction to that of the copy medium, the easy axis of the mother medium being positioned at 20°±15° with respect to the in-plane direction of the mother medium, the magnetic recordings on the mother medium being transferred onto the copy medium by externally applying a biased magnetic field to the mother medium substantially at 110°±15° relative to the in-plane direction.

According to a fourth aspect of the invention, there is provided a method of magnetically recording digital video signals as defined in the third aspect thereof, wherein the ratio of the coercive force $H_{CM}$ of the mother magnetic recording medium to the coercive force $H_{CC}$ of the copy magnetic recording medium satisfies the condition of $$H_{CM}/H_{CC} \leq 1.5$$

Preferably, the magnetic recording media for the invention to be embodied have a center line average height $R_a$ of 30 angstrom units or less on the surface.

These and other objects, features and advantages of the invention will become more apparent upon a reading of the following description and appended drawings.

BRIEF DESCRIPTION OF THE DRAWINGS

FIGS. 19A and 19B show two parts of a table which are joined together as shown in FIG. 19 and illustrates typical transfer output. Measurements taken of copy tapes in diverse sample combinations with mother tapes, the combinations varying in magnetic layer material, film structure and other tape-related factors;

DESCRIPTION OF THE PREFERRED EMBODIMENTS

As described, the magnetic recording transfer method according to the invention uses a mother magnetic recording medium and a copy magnetic recording medium of a metal thin film type each, i.e., media having diagonally deposited magnetic metal. In this case, as described, the magnetic metal material is deposited from a deposition source onto the medium base diagonally within an angular range of 90° to 40°. The resulting magnetic layer comprises bent columns 3 with an inclination of about 45°, the columns being growth grains. However, according to the research and experiments conducted by the inventors, the actual easy axis of the magnetic layer fails to match the growing direction of the columns 3; the easy axis is determined by the thickness and saturation magnetic flux density of the columns 3. In fact, the easy axis was found to be inclined less in the growing direction of the columns 3 than in the in-plane direction, i.e., about 20°±15° relative to the in-plane direction.

Accordingly, the magnetic recording transfer method of the present invention applies the biased magnetic field $H_B$ externally at 110°±15° to the mother magnetic recording medium 1. This means that the biased magnetic field $H_B$ is applied precisely in the direction of the hard axis of the mother medium 1. As a result, the efficiency of magnetic recording transfer is enhanced.

As described and also according to the invention, the mother magnetic recording medium 1 and the copy magnetic recording medium 2 are overlaid in such a manner that the inclination of the columns 3 in one medium is opposite in direction to that of the columns 3 in the other medium. In this state, the biased magnetic field $H_B$ externally applied to the mother magnetic recording medium 1 transfers the recordings thereon onto the copy magnetic recording medium 2. This scheme provides a high transfer output.

Assume that the mother magnetic recording medium 1 and the copy magnetic recording medium 2 are made of the same material and that the easy axis of either medium is positioned at 20°. For example, if the easy axis of the mother magnetic recording medium 1 is positioned at 20°, then the easy axis of the copy magnetic recording medium 2 is positioned at 160°, the columns 3 of the medium 2 being opposite in direction to those of the medium 1.

Figure 2:
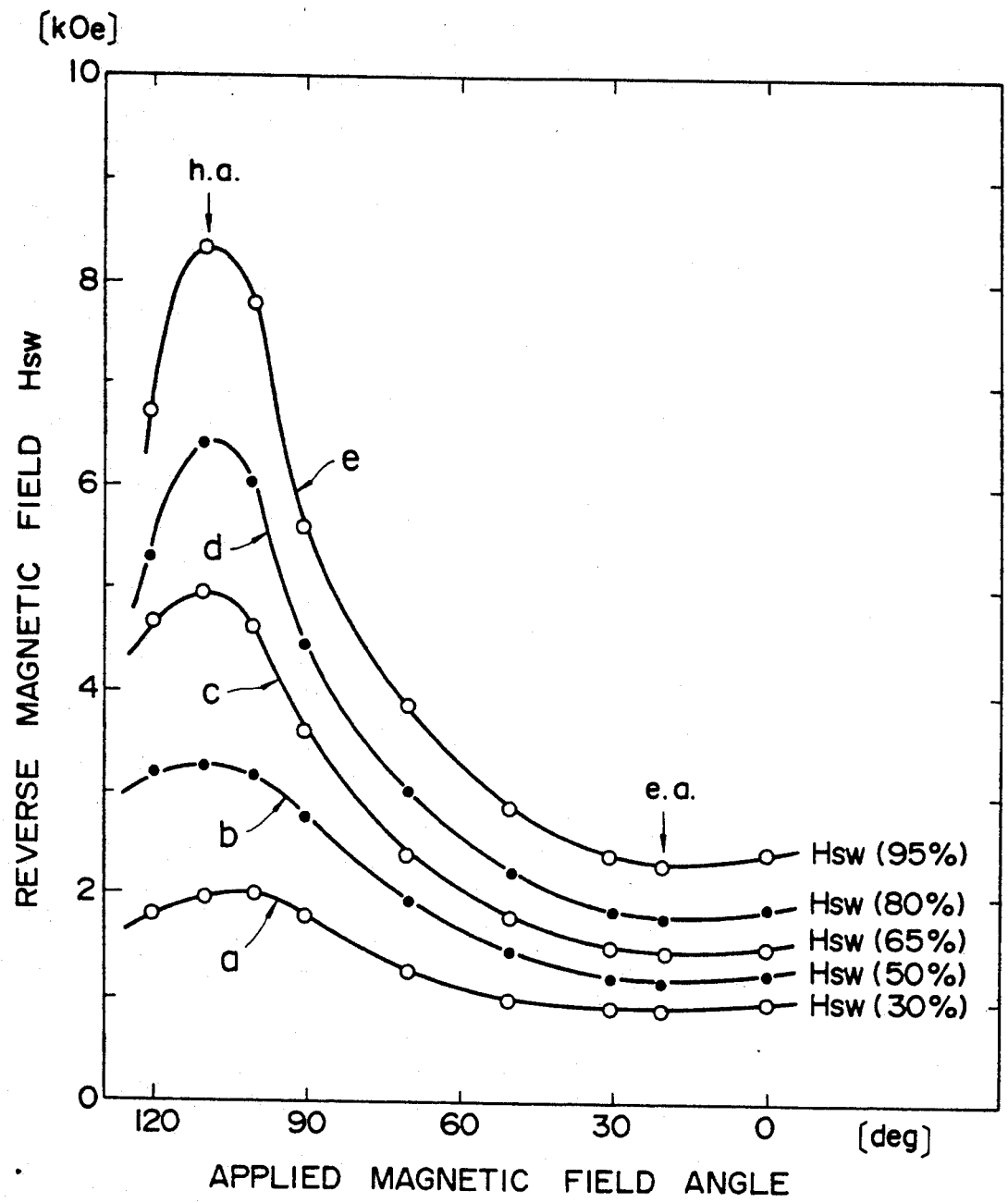
FIG. 2 is a view showing how dependent the magnetization reversal distribution of recording media is on applied magnetic field angles, the media being tapes with a diagonally deposited metal structure each.
Figure 3:
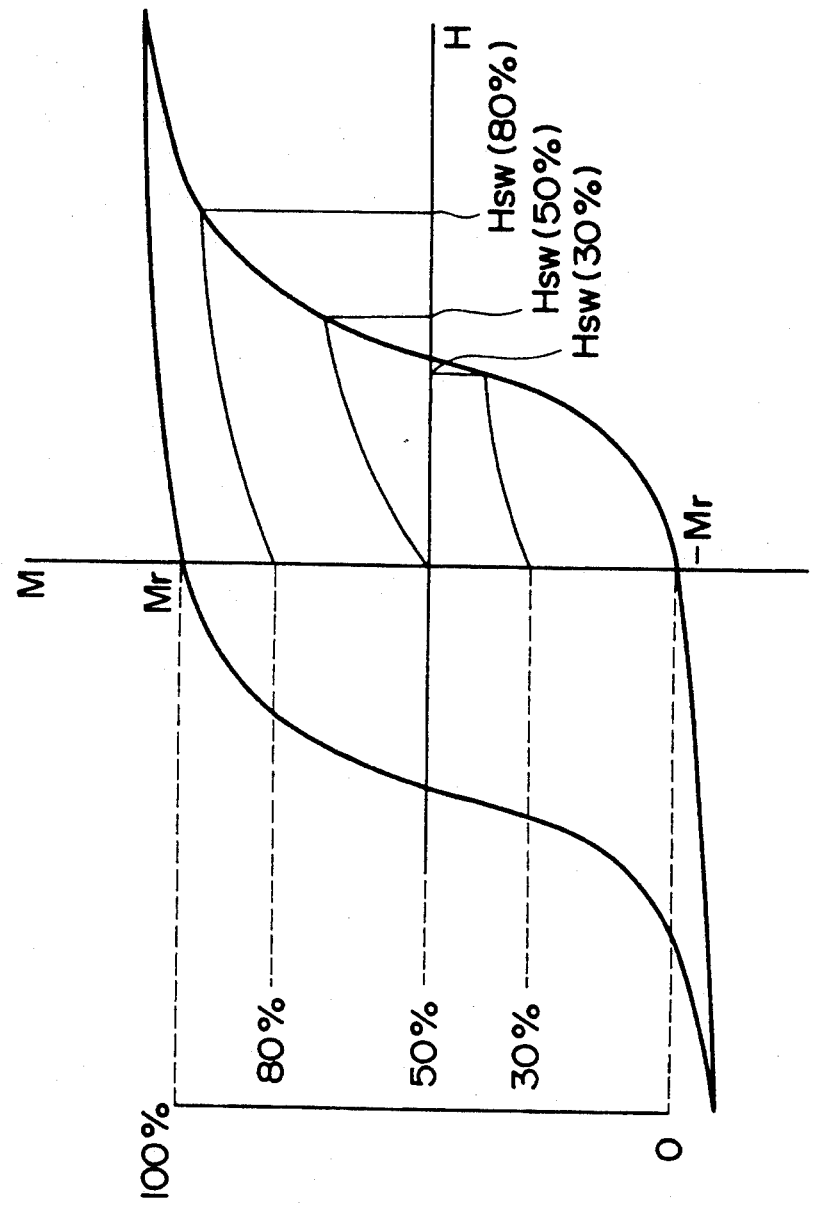
FIG. 3 is a view depicting a typical relationship between residual magnetization and reverse magnetic field.

FIG. 2 shows how the angle at which to apply the biased magnetic field $H_B$ externally is related to a reverse magnetic field $H_{SW}$. The reverse magnetic field $H_{SW}$ is needed to generate $\eta\%$ of magnetization reversal, as depicted by an H-M curve (magnetic field versus magnetization curve) in FIG. 3. FIG. 2 illustrates the relationship between magnetic field application angle and reverse magnetic field $H_{SW}$ in effect when the percentage ($\eta$) of magnetization reversal is varied.

In FIG. 2, curves "a" through "e" apply when $H_{SW}$ is 30%, 50%, 65%, 80% and 95%, respectively.

As shown in FIG. 2, each of the curves shows the minimum magnetic field necessary for magnetization change at about 20°, i.e., in the direction of the easy axis of the mother magnetic recording medium 1; the curves each indicate the maximum magnetic field necessary for magnetization change at about 110°, i.e., in the direction of the hard axis of the medium 1. Thus a magnetic field of, say, 3 k (Oe) generates 95% or more of magnetization reversal if applied in the direction of the easy axis, but only about 50% if applied in the direction of the hard axis.

As described, the magnetic recording transfer method according to the invention externally applies the biased magnetic field $H_B$ illustratively at 110° to the mother magnetic recording medium 1, i.e., in the direction of the hard axis thereof. This leaves the recording magnetic field of the medium 1 highly immune to the effect of the biased magnetic field $H_B$, hence to demagnetization.

At this point, the magnetization reversal distribution has a steep peak near the hard axis, whereas the curvature of the distribution is relatively small near the easy axis. Thus any deviation from the hard axis direction causes an abrupt change in the reverse magnetic field, i.e., in residual magnetization, but little change occurs therein in case of 40° to 50° of deviation from the easy axis. For example, if the above-mentioned magnetic field of 3 k (Oe) is applied at 60°, i.e., about 50° away from the hard axis direction, then 80% or more of magnetization reversal is produced. There occurs a difference of about 15% from the case where the magnetic field is applied in the easy axis direction, but as much as 30% from the case in which the magnetic field is applied in the hard axis direction.

As described, with the easy axis of the copy medium 2 positioned at 160° and with the biased magnetic field applied at 110° to the mother medium 1, magnetic recordings are transferred satisfactorily from mother medium to copy medium. For example, even when the mother magnetic recording medium 1 and the copy magnetic recording medium 2 are made of the same material, the above arrangement provides a significant improvement in transfer efficiency.

According to the invention, the ratio of the coercive force $H_{CM}$ of the mother magnetic recording medium 1 to the coercive force $H_{CC}$ of the copy magnetic recording medium 2 satisfies the condition of $$H_{CM}/H_{CC} \leq 1.5$$

This aspect of the invention makes it possible relatively to boost the coercive force of the copy medium 2. This also leads to an enhanced magnetic recording transfer output.

With the conventional magnetic recording transfer method that uses metal-coated magnetic recording media, it is difficult to select optimum directions of the easy and hard axes for such media. By contrast, the present invention makes it possible to select optimum directions of the easy and hard axes of magnetic recording media illustratively having a diagonally deposited metal thin film structure.

Thus it is possible to prevent demagnetization of the mother magnetic recording medium upon transfer of magnetic recordings therefrom to a copy magnetic recording medium, and to enhance the transfer output of the copy medium. Even if the recording wave length is as short as 0.5 $\mu$m, the transfer output of the copy medium is still sufficiently high.

Preferred embodiments of the present invention will now be described with reference to the accompanying drawings.

First Embodiment

Figure 1:
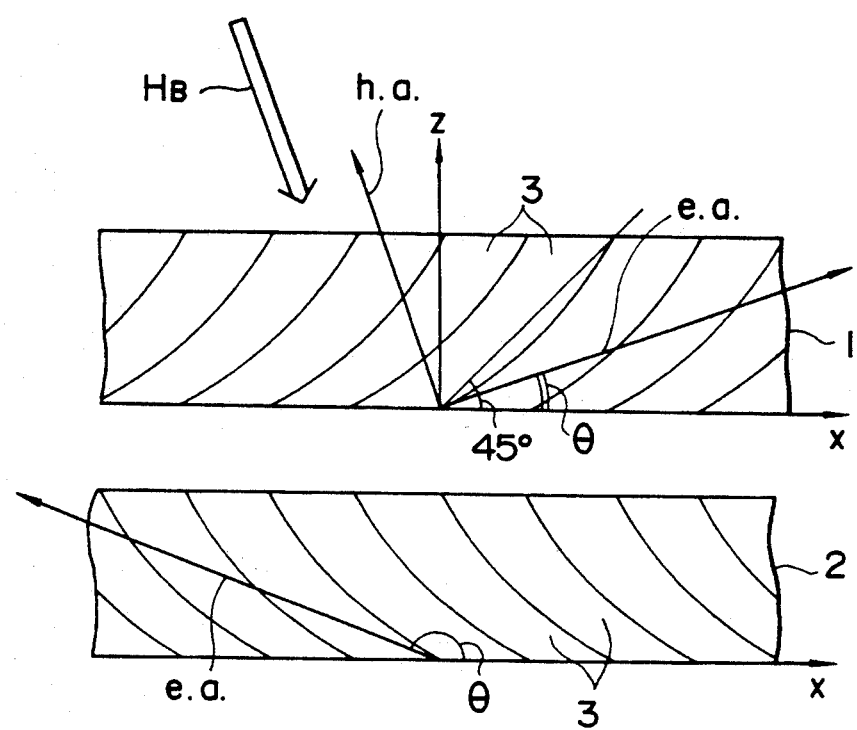
FIG. 1 is a schematic cross-sectional view of a magnetic recording transfer method according to the invention.

In FIG. 1, numeral 1 is a mother magnetic recording medium and numeral 2 is a copy magnetic recording medium. Each medium is illustratively a tape with a diagonally deposited metal structure made of 80% Co and 20% Ni. With the first embodiment, the residual magnetic flux density Br of the media is 3,500 G, the coercive force $H_C$ thereof is 1,000 Oe, and the easy axis thereof is positioned at about 21°. The media 1 and 2 are overlaid so that the easy axis of the copy magnetic recording medium 2 is positioned at 159°. In this case, the ratio of the coercive force $H_{CM}$ of the mother magnetic recording medium 1 to the coercive force $H_{CC}$ of the copy magnetic recording medium 2 ($H_{CM}/H_{CC}$) is 1.0.

Figure 4:
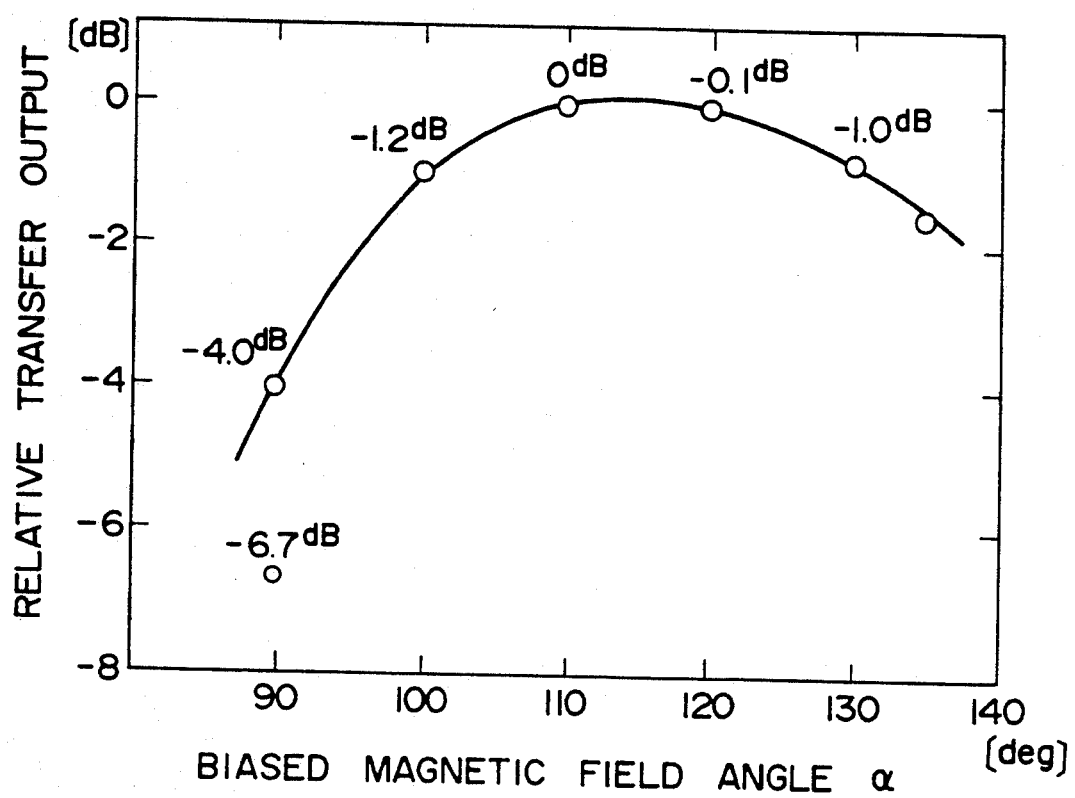
FIG. 4 is a view illustrating a typical relationship between biased magnetic field angles and relative transfer outputs.

FIG. 4 shows how the magnetic recording transfer output changes as the angle $\alpha$ of the biased magnetic field $H_B$ (hereinafter called the biased magnetic field angle) is varied, with the wave length $\lambda$ set to 0.76 μm. Also shown as a comparative example are typical changes in the transfer output in effect when the mother medium is a conventional metal-coated, high coercive force, high performance tape and the copy medium is a Ba-Fe tape.

In FIG. 4, small hollow circles (○) are plotted by the first embodiment when the biased magnetic field angle $\alpha$ is varied, and small solid circles (●) are plotted as the comparative example when the biased magnetic field angle $\alpha$ is set to 90°. Transfer output values are shown relative to the maximum output of the first embodiment being set to 0 dB.

As depicted in FIG. 4, when the biased magnetic field angle $\alpha$ is set to 90°, the first embodiment provides a transfer output at least 2.5 dB higher than that of the comparative example. Where the biased magnetic field angle $\alpha$ is varied and set to 111°, i.e., in the hard axis direction of the mother magnetic recording medium 1, the maximum transfer output is obtained. This output is at least 4 dB higher than that given when $\alpha=90°$.

Below is a description of three more embodiments. With these embodiments, the residual magnetic flux density Br and coercive force $H_C$ are varied and the resulting transfer outputs are measured.

Second Embodiment

The second embodiment utilizes as the mother magnetic recording medium 1 a tape with a diagonally deposited metal structure made of 100% Co. The residual magnetic flux density Br of the mother medium 1 is 4,100 G, the coercive force $H_C$ thereof is 1,400 Oe, and the easy axis thereof is positioned at 19°. As with the first embodiment, the copy magnetic recording medium 2 is a tape with a diagonally deposited metal structure made of 80% Co and 20% Ni. The residual magnetic flux density Br of the copy medium 2 is 3,500 G, the coercive force $H_C$ thereof is 1,000 Oe, and the easy axis thereof is positioned at 21°. The media 1 and 2 are overlaid so that the easy axis of the copy magnetic recording medium 2 is positioned at 159°. The biased magnetic field $H_B$ is applied at 109°, i.e., in the hard axis direction of the mother medium 1.

Third Embodiment

The third embodiment utilizes as both mother and copy media 1 and 2 a tape with a diagonally deposited metal multilayer structure made of 100% Co. With the third embodiment, the residual magnetic flux density Br of the media is 4,600 G, the coercive force $H_C$ thereof is 1,500 Oe, and the easy axis thereof is positioned at 25°. The media 1 and 2 are overlaid so that the easy axis of the copy magnetic recording medium 2 is positioned at 155°. The biased magnetic field $H_B$ is applied at 115°.

Fourth Embodiment

The fourth embodiment employs as the mother medium 1 a tape with a diagonally deposited metal double-layer structure made of 100% Co. The residual magnetic flux density Br of the mother medium 1 is 4,700 G, the coercive force $H_C$ thereof is 1,900 Oe, and the easy axis thereof is positioned at 27°. The fourth embodiment also uses as the copy medium 2 a tape with a diagonally deposited metal double-layer structure made of 100% Co. The residual magnetic flux density Br of the copy medium 1 is 4,650 G, the coercive force $H_C$ thereof is 1,700 Oe, and the easy axis thereof is positioned at 23°. The media 1 and 2 are overlaid so that the easy axis of the copy magnetic recording medium 2 is positioned at 157°. The biased magnetic field $H_B$ is applied at 117° to the mother medium 1, i.e., in the hard axis direction thereof.

Table 1 below indicates actual transfer output measurements taken with each of the first through the fourth embodiments above, where the wave length $\lambda$ was set to 0.76 μm.

TABLE 1

| Embodiment | First | Second | Third | Fourth |
|---|---|---|---|---|
| Biased magnetic field angle $\alpha$ | 111° | 109° | 115° | 117° |
| Transfer output (dB) | 0 | +2.2 | +5.3 | +5.8 |

As shown in Table 1, even where the wave length ($\lambda$) is as short as 0.76 μ, high transfer outputs are obtained by raising the residual magnetic flux density Br and coercive force $H_C$ of the mother and copy media 1 and 2.

As indicated, the second through the fourth embodiments yield transfer outputs higher by 9 to 12 dB than those gained by the conventional method using metal-coated tapes.

Thus, to obtain these practically significant increases in transfer output requires that, on the part of the mother magnetic recording medium 1, Br (magnetic flux density) ≧ 4,000 G in practice, Br·δ (total magnetic flux quantity) ≧ 0.08 G·cm and that Hc (coercive force) ≧ 1,000 Oe preferably Hc ≧ 1,300 Oe On the part of the copy magnetic recording medium 2, it is required that Br (magnetic flux density) ≧ 2,500 G Br·δ (total magnetic flux quantity) ≧ 0.05 G·cm 800 ≦ Hc (coercive force) ≦ 1,800 Oe The 1,800 Oe threshold is preferably not to be exceeded because an excessively high coercive force of the copy medium 2 will make it difficult to transfer magnetic recordings thereto from the mother medium 1.

Fifth Embodiment

The fifth embodiment involves copying digital VTR tapes through magnetic transfer of recording. The description of this embodiment will proceed in the order of:

a. Signal processing section
b. Block encoding
c. Channel encoder and channel decoder
d. Tape head section
e. Electromagnetic conversion section a. Signal Processing Section

Described first is a signal processing section in a digital VTR for use with the invention.

Figure 5:
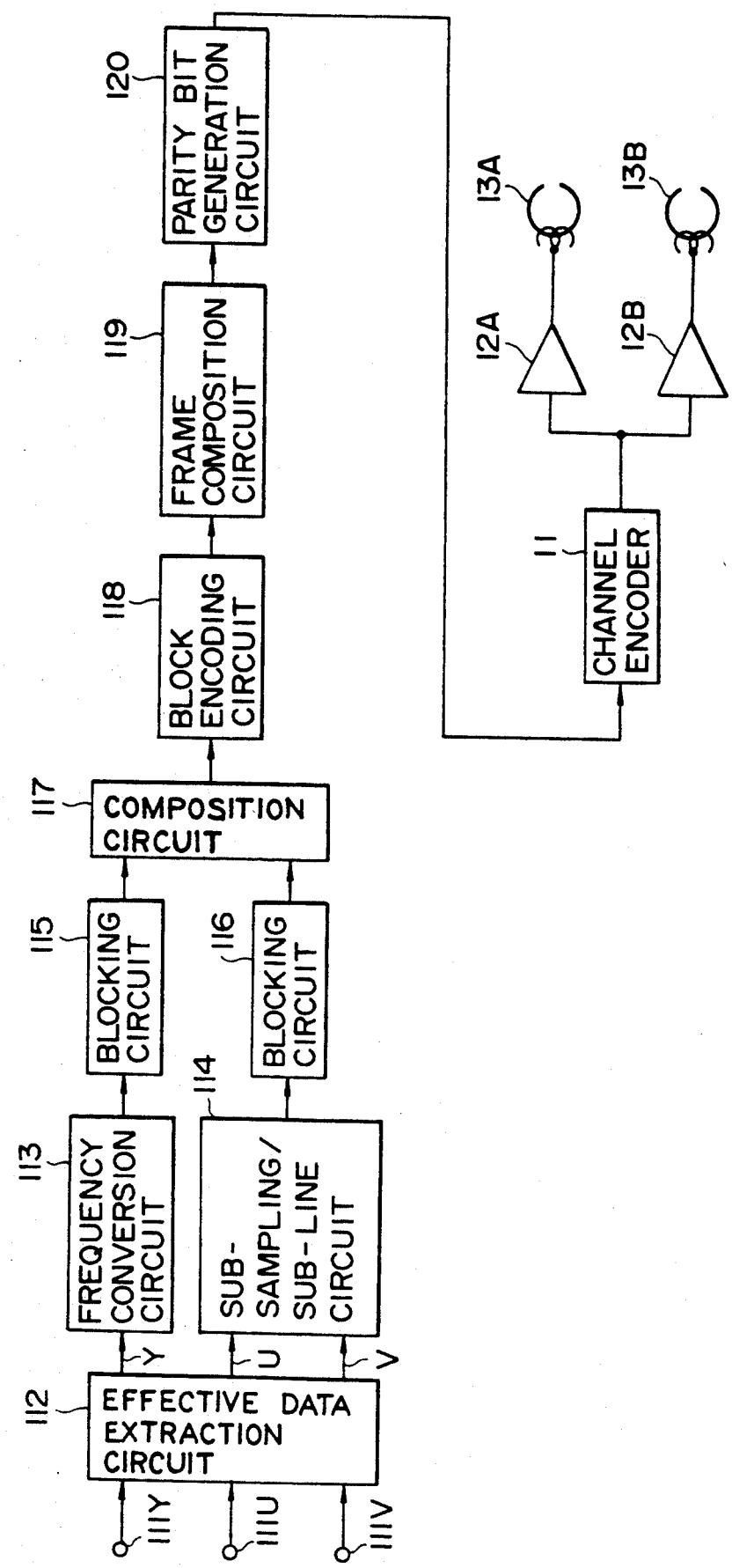
FIG. 5 is a block diagram of the recording side of a signal processing section in a typical digital VTR for use with the invention.

FIG. 5 is a block diagram of the recording side of the signal processing section in the typical digital VTR for use with the invention. In FIG. 5, input terminals 111Y, 111U and 111V illustratively receive a digital luminance signal Y, a digital color difference signal U and a digital color difference signal V, respectively. The signals Y, U and V are formed from three primary color signals R, G and B coming from a color video camera. The clock rates for the signals are the same as the frequencies of the respective component signals in the D1 format, i.e., 13.5 MHz for the signal Y, 6.75 MHz for the signal U and also 6.75 MHz for the signal Y. The bit count per sample is eight. Thus the amount of the data making up the signals supplied to the input terminals 111Y, 111U and 111V amounts to about 216 Mbps, as described. An effective data extraction circuit 112 eliminates blanking period data and extracts only the effective area information, thereby compressing the data into about 167 Mbps. Of the outputs from the circuit 112, the luminance signal Y is supplied to a frequency conversion circuit 113. The circuit 3 converts the sampling frequency of 13.5 MHz of the luminance signal Y to three quarters thereof. The frequency conversion circuit 113 may typically be a thin-out filter that does not cause back-to-back distortion. The output signal of the circuit 113 is fed to a blocking circuit 115. The circuit 115 converts the luminance data sequence to a block sequence. The blocking circuit 115 is provided in conjunction with a block encoding circuit 118 located downstream.

Figure 7:
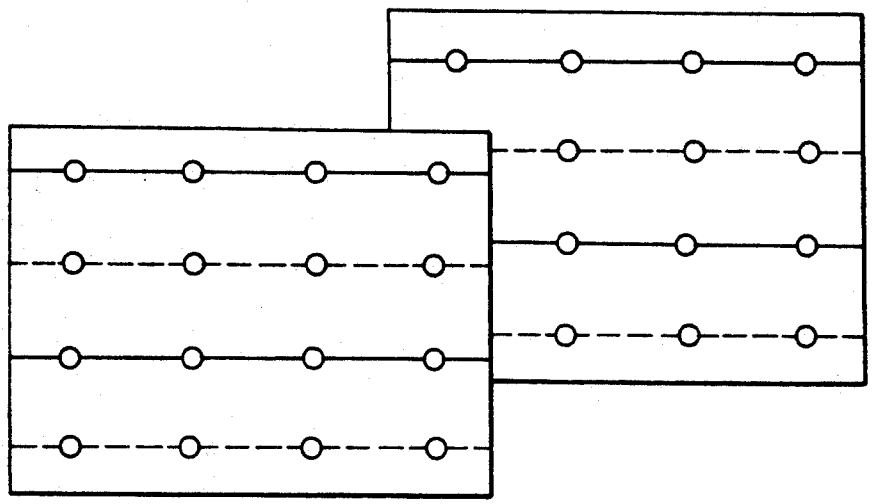
FIG. 7 is a schematic view of a typical block structure for block encoding in connection with the invention.

FIG. 7 schematically depicts the structure of a typical unit block for encoding. This example is a three-dimensional block illustratively constituted by divisions of a picture that spans two frames. A large number of unit blocks each having 4 lines by 4 pixels by 2 frames, as shown in FIG. 7, are formed. In FIG. 7, solid lines are odd-numbered field lines and broken lines are even-numbered field lines.

Figure 8:
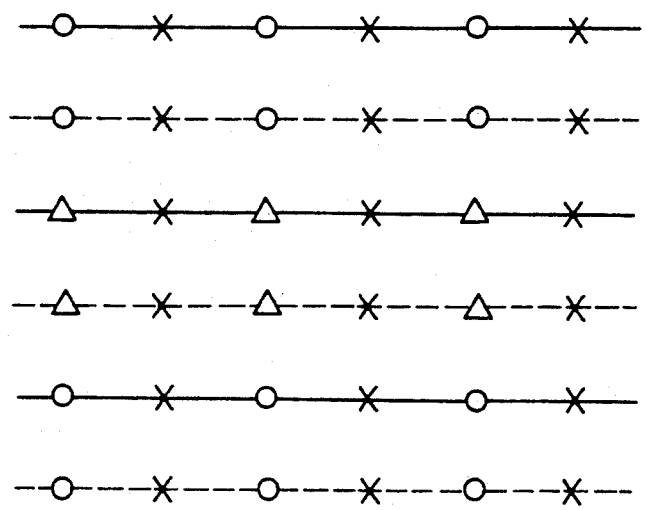
FIG. 8 is a schematic view used to describe subsampling and sub-lines in connection with the invention.

Of the outputs from the effective data extraction circuit 112, the two color difference signals U and V are supplied to a sub-sampling/sub-line circuit 114. The circuit 114 converts the sampling frequencies of the two signals U and V from 6.75 MHz to half thereof. Thereafter, the two digital color difference signals are alternately selected per line and are composed into one-channel data. That is, the sub-sampling/sub-line circuit 114 yields linearly sequenced digital color difference signals. FIG. 8 illustrates the pixel structure of a signal that is sub-sampled and sub-lined by the circuit 114. In FIG. 8, hollow circles (◯) each stand for a sampling pixel of the first color difference signal U, triangles (Δ) for a sampling pixel of the second color difference signal V, and crosses (X) for the position of a pixel removed by sub-sampling.

The linearly sequenced output signal of the sub-sampling/sub-line circuit 114 is supplied to a blocking circuit 116. As with the blocking circuit 115, the circuit 116 converts the scanning sequence color difference data of the TV signal into block sequence data. Furthermore, like the circuit 115, the circuit 116 converts the color difference data into a block structure of 4 lines by 4 pixels by 2 frames. The outputs of the blocking circuits 115 and 116 are forwarded to a composition circuit 117.

The composition circuit 117 converts into one-channel data the luminance and color difference signals that were converted to the block sequence. The output signal of the composition circuit 117 is fed to the block encoding circuit 118. The block encoding circuit 118 may illustratively be an adaptive dynamic range coding (ADRC) circuit (described later) adapted to the dynamic range per block, a DCT circuit, etc. The output signal of the block encoding circuit 118 is supplied to a frame composition circuit 119. The circuit 119 converts the received signal into frame structure data. The frame composition circuit 119 switches between the clock signal of the video side and that of the recording side.

The output signal of the frame composition circuit 119 is sent to a parity bit generation circuit 120 that generates error correction codes. The output signal of the parity bit generation circuit 120 is supplied to a channel encoder 11. In turn, the channel encoder 11 carries out channel coding in such a manner that the lowpass portion of the recording data is reduced. The output signal of the channel encoder 11 is fed to magnetic heads 13A and 13B via recording amplifiers 12A and 12B as well as a rotary transformer arrangement, not shown. The signal is then recorded onto a magnetic tape.

Although not shown in the drawings, the audio signal is compression-coded apart from the video signal and is supplied to the channel encoder.

After the above signal processing, the input data amount of 216 Mbps is lowered to about 167 Mbps through sampling during the effective scanning period alone. The lowered data amount is further reduced to 84 Mbps through frequency conversion and sub-sampling/sub-line processing. The resulting data amount is again compression-coded by the block encoding circuit 118 down to about 25 Mbps. Thereafter, with such supplementary information as parity and audio signals added, the recording data amount totals up to about 31.56 Mbps.

Now the construction of the reproduction side of the signal processing section will be described with reference to FIG. 6.

Figure 6:
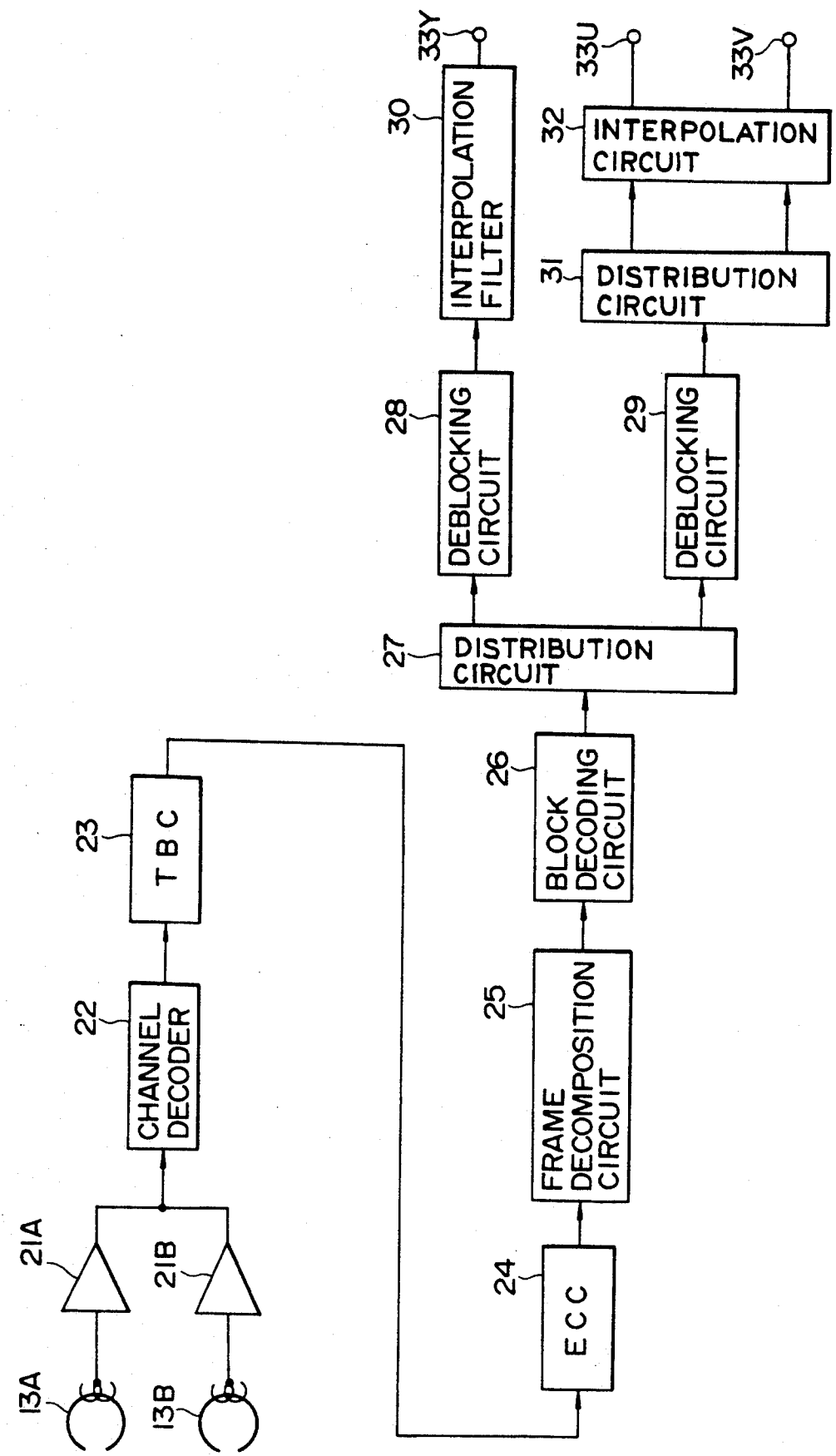
FIG. 6 is a block diagram of the reproduction side of the same signal processing section.

In FIG. 6, the reproduced data from the magnetic heads 13A and 13B is supplied to a channel decoder 22 via a rotary transformer arrangement, not shown, and via reproduction amplifiers 21A and 21B. The channel decoder 22 decodes the channel-encoded data. The output signal of the channel decoder 22 is supplied to a TBC (time base correction) circuit 23. The circuit 23 removes time base fluctuation components from the reproduced signal. The reproduced data from the TBC circuit 23 is fed to an ECC circuit 24. The circuit 24 subjects the data it received to error checking and correction using error correction codes. The output signal of the ECC circuit 24 is supplied to a frame decomposition circuit 25.

The frame decomposition circuit 25 separates the block-encoded data into components and switches from the clock signal of the recording side to that of the video side. The data components separated by the frame decomposition circuit 25 are supplied to a block decoding circuit 26. The encoded data is decoded back to the original data on a block by block basis. The decoded data is fed to a distribution circuit 27. The circuit 27 separates the decoded data into the luminance signal and the color difference signals. The luminance signal is fed to a deblocking circuit 28, and the color difference signals are supplied to a deblocking circuit 29. As opposed to what the blocking circuits 115 and 116 do on the transmitting side, the deblocking circuits 28 and 29 convert the block sequence decoded data into a raster scan sequence.

The decoded luminance signal from the deblocking circuit 28 is sent to an interpolation filter 30. The interpolation filter 30 converts the sampling rate of the luminance signal from 3 fs to 4 fs (4 fs=13.5 MHz). The digital luminance signal from the interpolation circuit 30 is forwarded to an output terminal 33Y.

Meanwhile, the digital color difference signals from the deblocking circuit 29 are supplied to a distribution circuit 31. The circuit 31 separates the linearly sequenced digital color signals U and V into the digital color difference signals U and V. The signals U and V from the distribution circuit 31 are fed to an interpolation circuit 32 for their respective interpolation processes. Using the decoded pixel data, the interpolation circuit 32 interpolates the lines and pixel data that were thinned out. The interpolation circuit 32 provides the digital color difference signals U and V at a sampling rate of 4 fs, the signals U and V being sent to output terminals 33U and 33V, respectively.

b. Block Encoding

The block encoding circuit 118 in FIG. 5 is illustratively the ADRC (adaptive dynamic range coding) encoder disclosed in Japanese Patents Laid-Open Nos. 59-266407 and 59-269866 filed by this applicant. The ADRC encoder detects the maximum and minimum numbers (MAX, MIN) of multiple pixel data contained in each block. The ADRC encoder then detects a dynamic range DR per block from the maximum (MAX) and minimum (MIN) pixel data counts. The data is encoded for adaptation to the dynamic range DR. Using a bit count smaller than the bit count of the original pixel data, the data is quantified again. Alternatively, the block encoding circuit 118 may be implemented as follows: After the pixel data of each block is subjected to DCT (discrete cosine transformation), the resulting coefficient data is quantified. The quantified data is subjected to the run-length Huffman encoding process for compression coding.

Described below is a typical encoder implemented using the above ADRC encoder with reference to FIG. 9, the encoder eliminating the deterioration in picture quality when the original tape is copied repeatedly.

Figure 9:
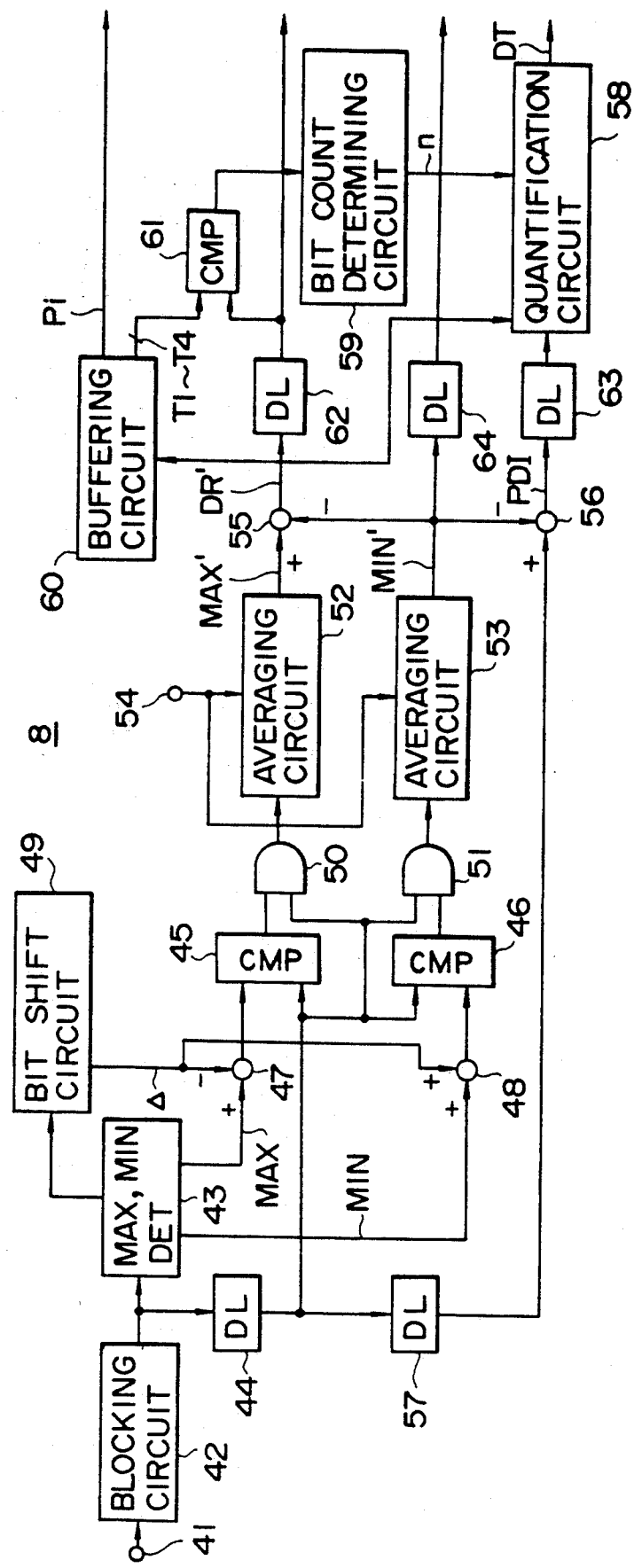
FIG. 9 is a block diagram of a typical block encoding circuit for use with the invention.

In FIG. 9, an input terminal 41 receives from the composition circuit 117 of FIG. 5 a digital video signal (or digital color difference signal) that was quantified illustratively into eight bits per sample.

The blocked data coming from the input terminal 41 goes to a maximum/minimum value detection circuit 43 and a delay circuit 44. The circuit 43 detects a maximum value MAX and a minimum value MIN from each block. The delay circuit 44 delays input data for as long as the time required to detect the maximum and minimum values. The pixel data from the delay circuit 44 is supplied to comparators 45 and 46.

The maximum value MAX from the maximum/minimum value detection circuit 43 is sent to a subtracter 47 and the minimum value MIN from the circuit 43 to an adder 48. The subtracter 47 and the adder 48 receive from a bit shift circuit 49 the value of one quantification step width ($\Delta = (1/16)DR$) for four-bit fixed-length non-edge matching quantification. The bit shift circuit 49 is constructed to shift the dynamic range DR by four bits for a divide operation of 1/16. The subtracter 47 provides a threshold value of $$MAX - \Delta$$

whereas the adder 48 yields a threshold value of $$MIN + \Delta$$

The threshold value from the subtracter 47 and that from the adder 48 are supplied to the comparators 45 and 46, respectively.

The value $\Delta$ that defines the threshold values is not limited to the quantification step width; it may be a fixed value commensurate with the noise level.

The output signal of the comparator 45 is fed to an AND gate 50 and that of the comparator 46 to an AND gate 51. The AND gates 50 and 51 are supplied with the input data from the delay circuit 44. The output signal of the comparator 45 is brought High when the input data is greater than the threshold value. Thus the output terminal of the AND gate 50 bears the pixel data of the input data contained in the maximum level range of $$MAX \sim MAX - \Delta$$

The output signal of the comparator 46 is brought High when the input data is smaller than the threshold value. Thus the output terminal of the AND gate 51 bears the pixel data of the input data contained in the minimum level range of $$MIN \sim MIN + \Delta$$

The output signal of the AND gate 50 is supplied to an averaging circuit 52 and that of the AND gate 51 to an averaging circuit 53. The averaging circuits 52 and 53 calculate mean values for each block. A terminal 54 feeds a block period reset signal to the circuits 52 and 53. The averaging circuit 52 provides a mean value MAX' of the pixel data belonging to the maximum level range of $$MAX \sim MAX - \Delta$$

and the averaging circuit 53 yields a mean value MIN' of the pixel data belonging to the minimum level range of $$MIN \sim MIN + \Delta$$

A subtracter 55 subtracts the mean value MIN' from the mean value MAX', thereby providing the dynamic range DR'.

The mean value MIN' is fed to a subtracter 56. The subtracter 56 then subtracts the mean value MIN' from the input data coming from the delay circuit 57. The result is data PDI which is rid of the minimum value. The data PDI and the corrected dynamic range DR' are supplied to a quantification circuit 58. The ADRC encoder used in this embodiment is a variable length encoder in which the number "n" of the bits assigned for quantification is set to 0 (no code signal transmitted), 1, 2, 3 or 4. The quantification assigned bit count "n" is determined by a bit count determination circuit 59 on a block by block basis. Thus the data of the bit count "n" is supplied to the quantification circuit 58.

For efficient encoding, the variable length ADRC encoder may have a small bit count "n" for blocks with a small dynamic range DR' and a large bit count "n" for blocks with a large dynamic range DR'. If the values T1 to T4 for determining the bit count "n" are set as $T1<T2<T3<T4$ then the block with its dynamic range defined as $DR'<T1$ has no code signal transmitted, i.e., only the data of the dynamic range DR' is transmitted. A block with its dynamic range defined as $T1 \leq DR'<T2$ has the bit count "n" set to 1. A block with its dynamic range defined as $T2 \leq DR'<T3$ has the bit count "n" set to 2. A block with its dynamic range defined as $T3 \leq DR'<T4$ has the bit count "n" set to 3. A block with its dynamic range defined as $DR' \geq T4$ has the bit count "n" set to 4.

The above variable length ADRC encoder provides control over the amount of generated data (i.e., buffering) by switching the threshold values (T1-T4). Thus the variable length ADRC encoder may be applied to the digital VTR of this invention and to other similar transmission lines that require the amount of the generated data per field or per frame to be a predetermined value.

In FIG. 9, a buffering circuit 60 determines the threshold values T1-T4 for setting the amount of generated data to a predetermined value. The buffering circuit 60 has a plurality of threshold value combinations (T1, T2, T3, T4), e.g., a total of 32 combinations. Each of these threshold value combinations is identified by a parameter code P1 (i=0, 1, 2, ... 31). As the number "i" of the parameter code Pi is raised, the amount of generated data is monotonously decreased. It is to be noted that the lower the amount of generated data is, the more deteriorated the quality of decoded pictures becomes.

The threshold values T1-T4 from the buffering circuit 60 are supplied to a comparator 61. The dynamic range DR' coming from the delay circuit 62 is fed to the comparator 61 as well. The delay circuit 62 delays the dynamic range DR' for as long as the time required for the buffering circuit 60 to determine the threshold value combination. The comparator 62 compares the dynamic range DR' of a given block with each threshold value. The result of the compare operation is sent to the bit count determination circuit 59. The circuit 59 in turn determines the number of the bits "n" assigned to the current block. Using the dynamic range DR' and the assigned bit count "n," the quantification circuit 58 subjects the data PDI to edge matching quantification for conversion to a code signal DT, the data PDI coming from the delay circuit 63 and rid of the minimum value. The quantification circuit 58 is illustratively made of a ROM arrangement.

The dynamic range DR' and mean value MIN' after correction are output through the delay circuits 62 and 64. Also output are the code signal DT and the parameter code Pi that identifies the threshold value combination. In this example, the signal that underwent non- edge matching quantification is again subjected to edge matching quantification on the basis of the newly acquired dynamic range information. For this reason, the deterioration in picture quality is minimum when the mother medium is copied.

c. Channel Encoder and Channel Decoder

Figure 10:
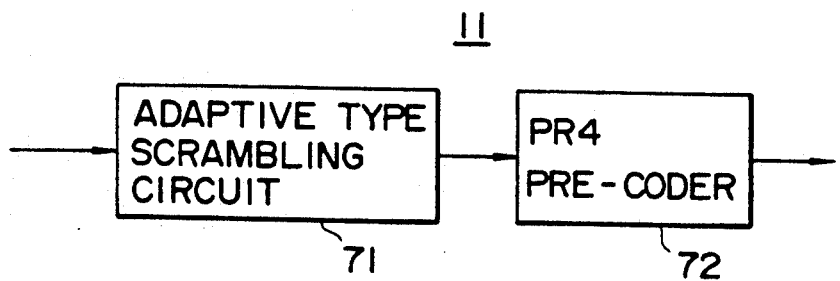
FIG. 10 is a schematic block diagram of a typical channel encoder for use with the invention.
Figure 11:
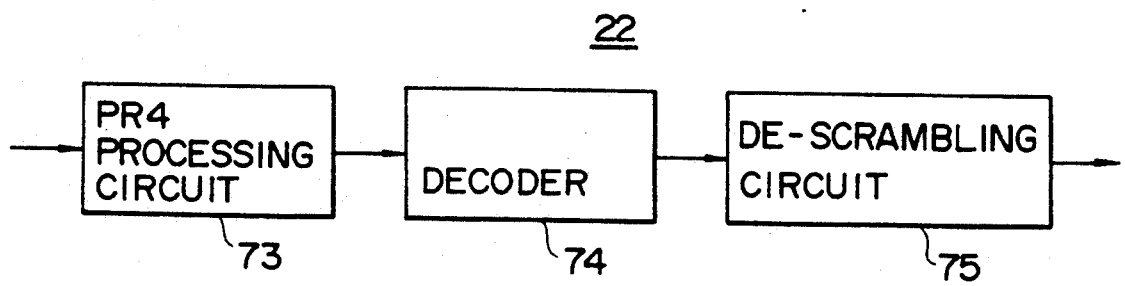
FIG. 11 is a schematic block diagram of a typical channel decoder for use with the invention.

The channel encoder 11 and channel decoder 22 in FIG. 5 will now be outlined in structure with reference to FIGS. 10 and 11. These circuits are disclosed in more detail in Japanese Patent Application No. 1-143491 filed by this applicant.

Referring to FIG. 10, numeral 71 is an adaptive type scrambling circuit that receives the output of the parity bit generation circuit 120 in FIG. 5. A plurality of M series scrambling circuits are prepared. These scrambling circuits are constructed to yield the output with the least high-frequency and direct-current components in response to the input signal. Numeral 72 is a pre-coder that operates on the so-called partial response class 4 detection method. This pre-coder performs computations of $$1/1 - D^2 (D: \text{circuit for unit delay})$$

The pre-coder output is sent via the recording amplifiers 12A and 12B to the magnetic heads 13A and 13B for recording and reproduction. The reproduced output is amplified by the reproduction amplifiers 21A and 21B.

FIG. 11 schematically depicts a typical construction of the channel decoder 22. In FIG. 11, numeral 73 is a processing circuit on the reproduction side of the partial response class 4 scheme. The circuit 73 carries out an operation of 1+D on the output of the reproduction amplifiers 21A and 21B. Numeral 74 is what is known as Viterbi decoder that decodes the output of the processing circuit 73 into noise-resistant data through computations based on data correlation and validation. The output of the Viterbi decoder 74 is supplied to a de-scrambling circuit 75. The de-scrambling circuit 75 restores the data scrambled on the recording side back to the original date. The Viterbi decoder 74 used in this embodiment provides an improvement of 3 dB in terms of reproduction C/N over bit-by-bit decoding.

d. Tape Head Section

Figure 12A:
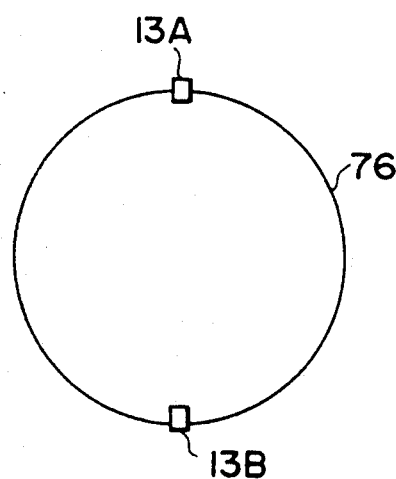
FIG. 12A is a schematic view used to describe a first head arrangement in connection with the invention.
Figure 12B:
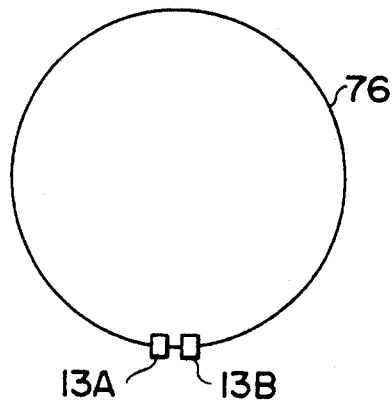
FIG. 12B illustrates a second head arrangement.

As shown in FIG. 12 (A), the magnetic heads 13A and 13B are mounted 180 degrees apart on a rotary drum 76. Alternatively, as depicted in FIG. 12 (B), the magnetic heads 13A and 13B are integrally mounted on the drum 76. A magnetic tape, not shown, is wound diagonally around the circumference of the drum 76 at slightly more or less than 180 degrees. In the head arrangement of FIG. 12 (A), the magnetic heads 13A and 13B contact the magnetic head on an approximately alternate basis; in the head arrangement of FIG. 12 (B), the magnetic heads 13A and 13B scan the magnetic tape simultaneously.

Figure 13:
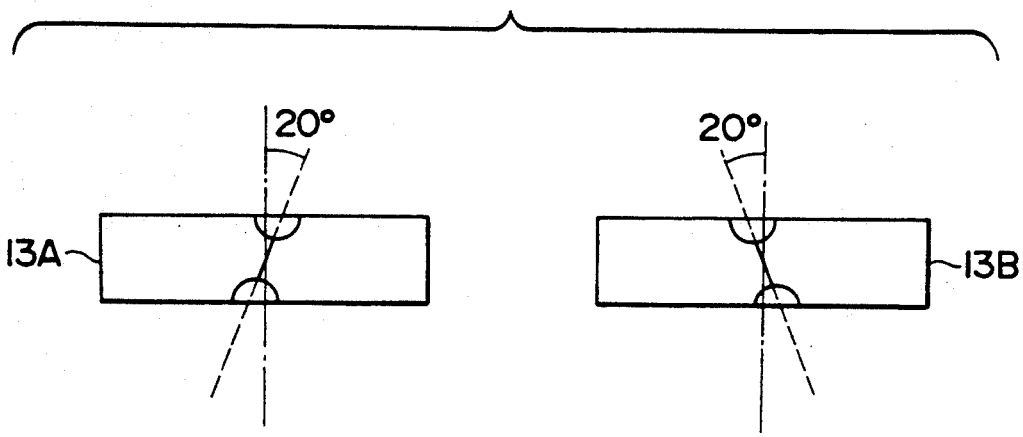
FIG. 13 is a schematic view used to describe head azimuths in connection with the invention.
Figure 14:
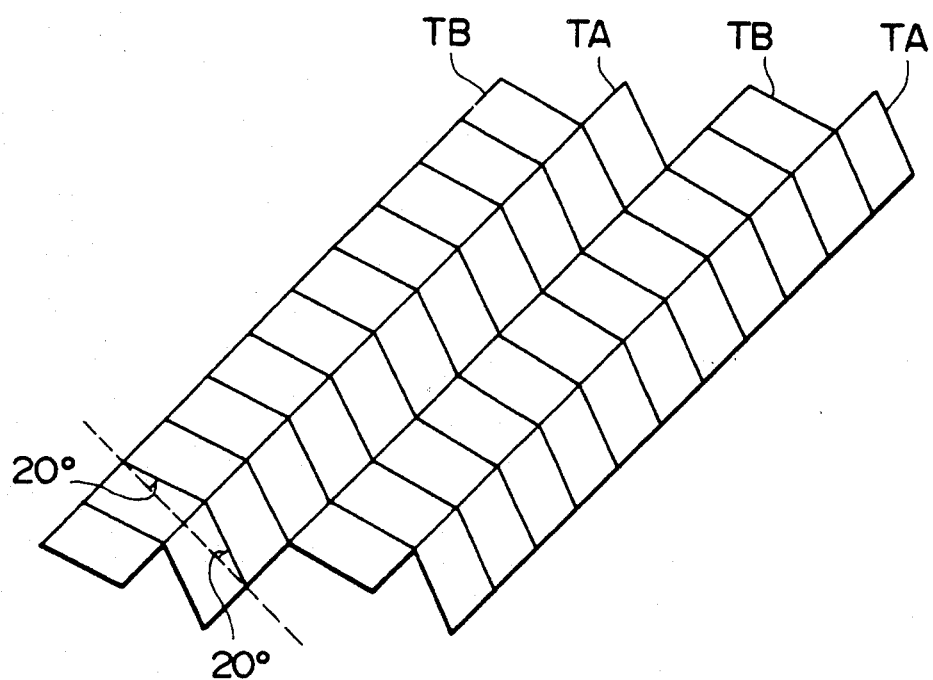
FIG. 14 is a schematic view used to describe recording patterns in connection with the invention.

The gap extension direction (called an azimuth) of the magnetic head 13A differs from that of the magnetic head 13B. Illustratively, an azimuth difference of ±20° is established between the heads 13A and 13B, as shown in FIG. 13. During recording, the azimuth difference causes a recording pattern depicted in FIG. 14 to be formed on the magnetic tape. As seen from FIG. 14, adjacent tracks TA and TB on the magnetic tape are formed respectively by the magnetic heads 13A and 13B having different azimuths. Thus upon reproduction, the loss of the azimuths reduces the amount of cross talk between adjacent tracks.

Figure 15A:
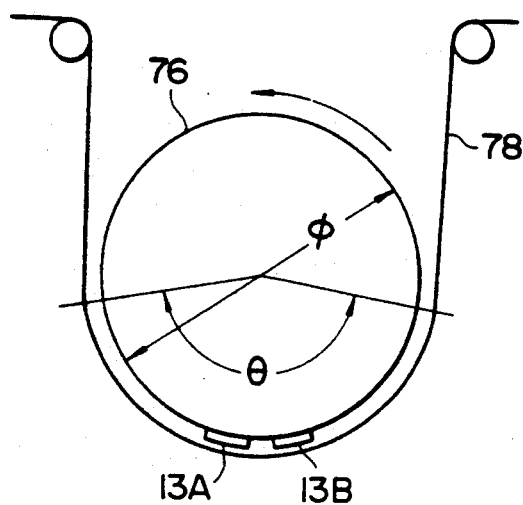
FIG. 15A is a top view and FIG. 15B is a side view of a typical tape head section.
Figure 15B:
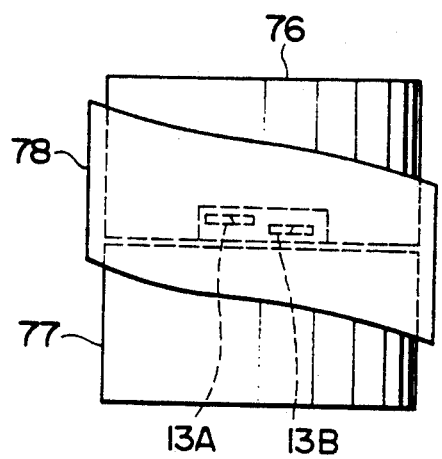

FIG. 15 (A) and FIG. 15 (B) show in more detail an integral structure of the magnetic heads 13A and 13B (generically known as the double azimuth head). For example, the magnetic heads 13A and 13B of the integral structure may be mounted on an upper drum 76 that rotates at a rate of as high as 150 rps (under NTSC system), while a lower drum 77 is fixed. Thus the data of one field is divided into five tracks when recorded onto a magnetic tape 78. This so-called segment system shortens the lengths of the tracks and reduces linear errors that may occur thereon. Illustratively, the winding angle $\theta$ of the magnetic tape 78 is 166° and the drum diameter $\phi$ is 16.5 mm.

Figure 16A:
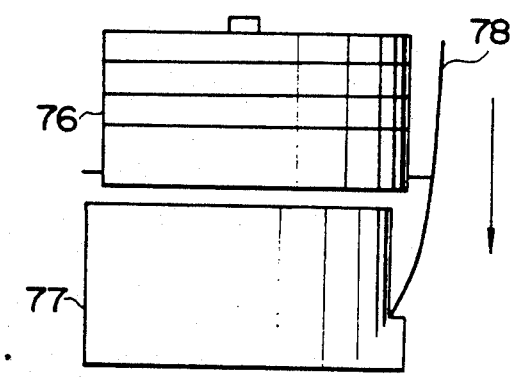
FIG. 16A is a plan view of tape and a head and FIG. 16B is a plan view of tape and a head.
Figure 16B:
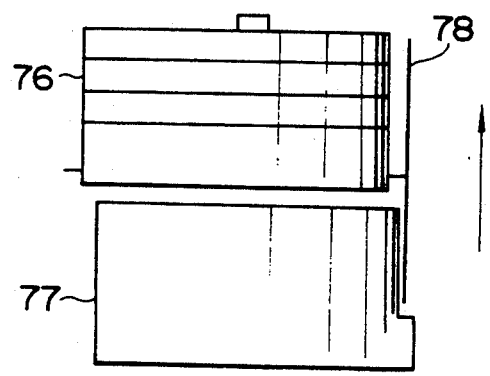

This double azimuth head structure carries out what is known as simultaneous recording. With an ordinary head structure, eccentricities of the rotating parts associated with the upper drum 76 cause the magnetic tape to 78 to vibrate, resulting in linear errors of tracks. The magnetic tape 78 vibrates when it is pushed downward as depicted in FIG. 16 (A) and pulled upward as shown in FIG. 16 (B). The vibration degrades the linearity of the tracks. By contrast, the double azimuth head structure performing simultaneous recording produces a lower amount of linear errors than the ordinary structure with the heads opposed to each other 180° apart. Because of its short head-to-head distance, the double azimuth head structure permits more accurate pairing adjustment. In this manner, the tape head section provides recording and reproduction on tracks having narrow widths.

e. Electromagnetic Conversion Section

What follows is a description of the electromagnetic conversion section for use with the invention.

The magnetic tape (ME tape) for use as the recording medium is manufactured by one of the four methods discussed below.

According to the first method, the magnetic tape is manufactured as follows: A liquid containing an emulsion whose principal content is an acrylic ester latex is applied onto a polyethylene terephthalate (PET) film base. After liquid application, the base is allowed to dry. On a principal plane of the dried base, infinitesimal projections made of the emulsion particles are formed. The surface of the base processed in the above manner has a center line average height $R_a$ of about 15 angstrom units, and the density of the infinitesimal projections is about 5 million/mm². The filler internally added to the base is $SiO_2$, $TiO_2$, $Al_2O_3$, etc.

Figure 17:
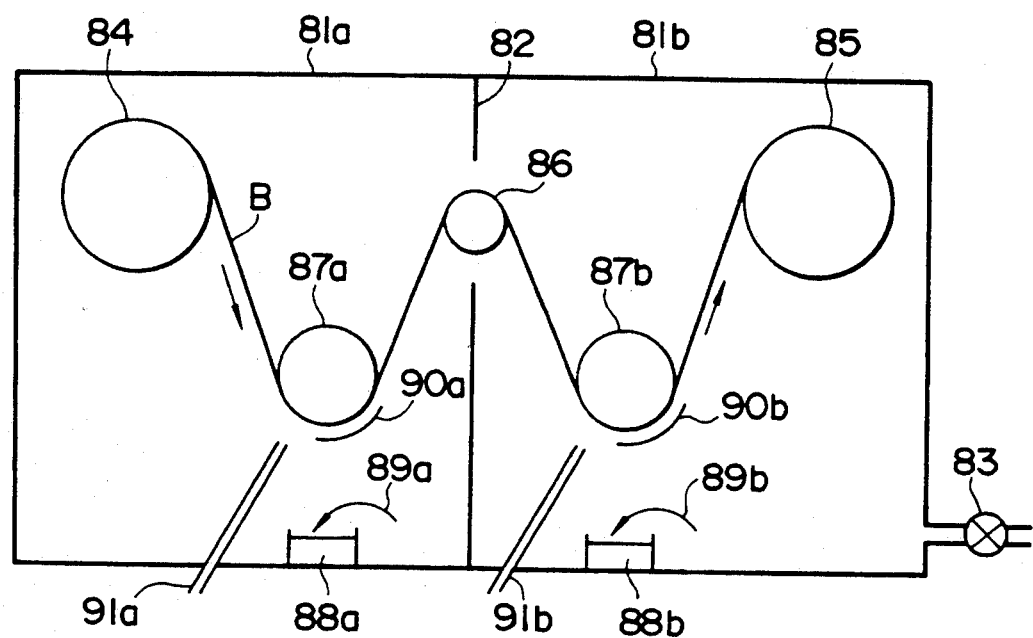
FIG. 17 is a schematic view of a device for manufacturing magnetic tapes in connection with the invention.

Thereafter, a vacuum deposition device illustratively shown in FIG. 17 is used to diagonally deposit a magnetic layer principally made of Co onto the above-described base in an oxygen atmosphere.

In FIG. 17, reference characters 81a and 81b are vacuum chambers; 82 is a partition wall; 83 is an evacuation valve; 84 is a supply roll that feeds a base B; 85 is a take-up roll; 86 is a guide roll; 87a and 87b are cylindrical cooling cans that guide the base B; 88a and 88b are Co evaporation sources; 89a and 89b are electron beams that heat up the evaporation sources 88a and 88b, respectively; 90a and 90b are shielding plates that restrict the incident angle of the evaporated metal relative to the base B; and 91a and 91b are pipes through which to introduce the oxygen gas.

In the vacuum evaporation device of the above construction, the base B is forwarded from the supply roll 84 to the take-up roll 85 via the cooling can 87a, guide roll 86 and cooling can 87b, in that order. While the base B is being forwarded, two Co layers forming a magnetic layer are diagonally deposited on the base B in the oxygen atmosphere.

The vacuum evaporation setup operates as follows: The vacuum chambers 81a and 81b are kept illustratively at a vacuum of $1 \times 10^{-4}$ Torr. The pipes 91a and 91b introduce the oxygen gas illustratively at a rate of 250 cc/min. into the vacuum chambers 81a and 81b. In this case, the incident angle of the evaporated metal relative to the base B is illustratively set between 45° ($\theta$ minimum) and 90° ($\theta$ maximum). The Co layers are each deposited illustratively to a thickness of 1,000 angstrom units at the cooling cans 87a and 87b. That is, the total thickness of the magnetic layer is 2,000 angstrom units. The composition of the ingots used as the evaporation sources 88a and 88b is illustratively 100% Co.

After the magnetic layer made of the two Co layers has been formed on the base B, the base B is back-coated with a carbon and epoxy resin binder coat, is treated with a preservative, and is top-coated with a perfluoropolyether lubricant. The base B is then cut to eight-millimeter width for production of eight-millimeter format magnetic tapes.

According to the inventors' measurements, the magnetic tape ultimately produced from the above process has a residual magnetic flux density ($B_r$) of 4,150 G, a coercive force $H_c$ of 1,760 Oe, and a squarenes $R_s$ of 79%. The surface roughness of the magnetic tape has a center line average height $R_a$ of as small as 20 angstrom units, reflecting the surface roughness of the base B. The energy product in the above case is given as $$B_r \cdot \delta \cdot H_c = 146.1 \, G \cdot cm \cdot Oe$$

Although surface roughnesses are usually measured under JIS B0601, the measurements this time were taken under the following conditions:

Measuring instrument: TALYSTEP (from Rank Raylor Hobson Limited)
Stylus diameter: $0.2 \times 0.2$ μm (rectangle stylus)
Stylus pressure: 2 mg
High-pass filter: 0.33 Hz According to the second method for manufacturing the magnetic tape, the vacuum evaporation device of FIG. 17 is also utilized. As with the first method, a magnetic layer illustratively made of two $Co_{90}Ni_{10}$ alloy layers is diagonally deposited on the base B in the oxygen atmosphere. In this case of diagonal deposition, the oxygen gas is introduced into the vacuum chambers 81a and 81b illustratively at a rate of 230 cc/min. The $Co_{90}Ni_{10}$ alloy layers are each deposited to a thickness of 900 angstrom units at the cooling cans 87a and 87b. The total thickness of the magnetic layer measures 1,800 angstrom units. The subsequent steps of making the eight-millimeter format magnetic tape are the same as with the first method.

According to the inventors' measurements, the magnetic tape ultimately produced from the above process has a residual magnetic flux density ($B_r$) of 4,100 G, a coercive force $H_c$ of 1,440 Oe, and a squareness $R_s$ of 81%. The surface roughness $R_a$ of the magnetic tape is 20 angstrom units. The energy product in this case is given as $$B_r \cdot \delta \cdot H_c = 106.3 \, G \cdot cm \cdot Oe$$

According to the third method for manufacturing the magnetic tape, the base B formed by the first method has a magnetic layer (principal content: Co) diagonally deposited thereon in the oxygen atmosphere by a vacuum evaporation device of FIG. 18.

Figure 18:
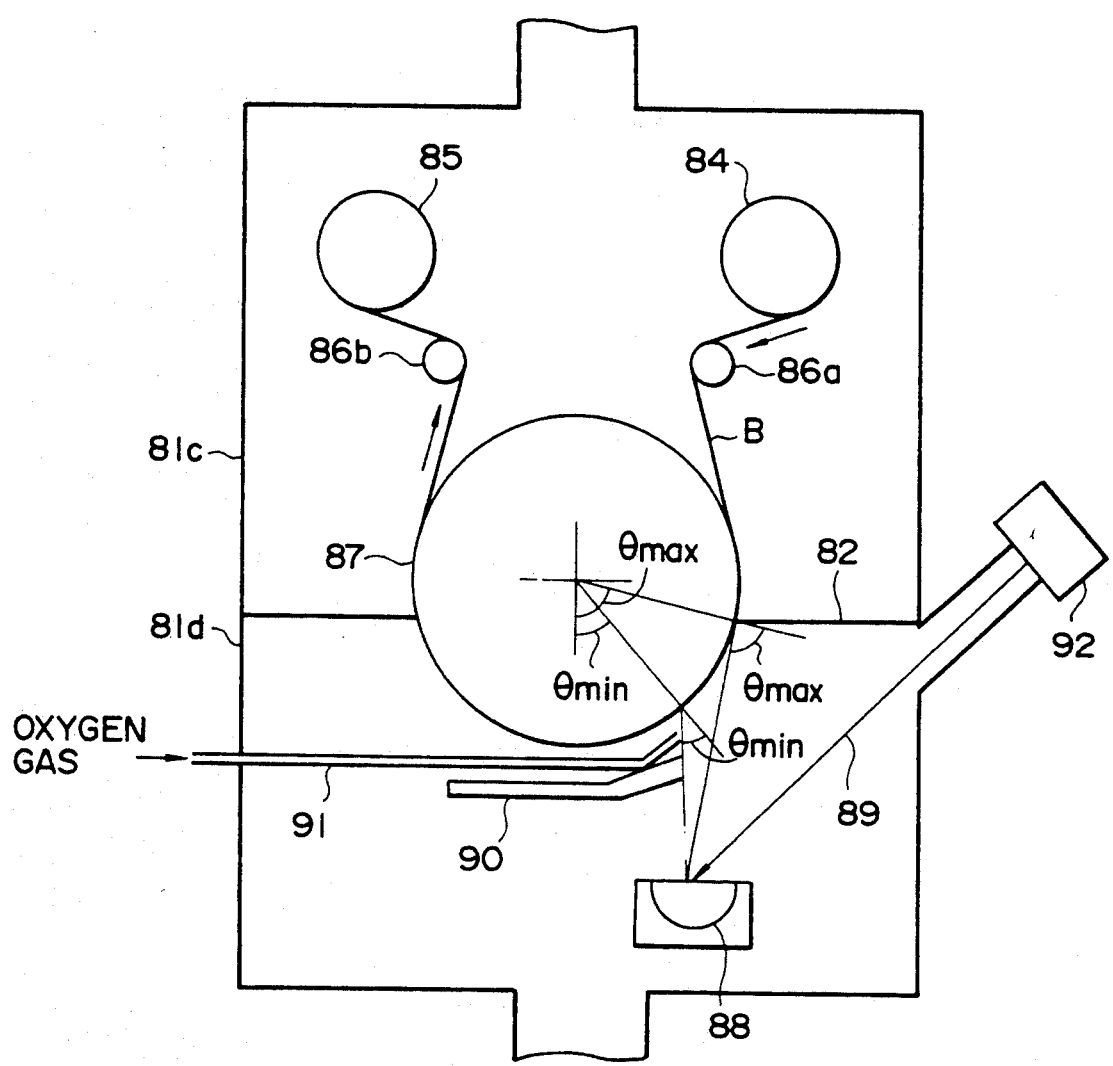
FIG. 18 is a schematic view of another device for manufacturing magnetic tapes in connection with the invention.

In FIG. 18, reference characters 81c and 81d are vacuum chambers; 82 is a partition wall; 84 is a supply roll that feeds the base B; 85 is a take-up roll; 86a and 86b are guide rolls; 87 is a cylindrical cooling can that guides the base B; 88 is an evaporation source; 89 is an electron beam that heats up the evaporation source 88; 90 is a shielding plate that restricts the incident angle of the evaporated metal relative to the base B; 91 is a pipe that introduces the oxygen gas; and 92 is an electron gun.

In the vacuum evaporation device of the above construction of FIG. 18, the base B is forwarded from the supply roll 84 to the take-up roll 85 via the guide roll 86a, cooling can 87 and guide roll 86b, in that order. While the base B is being forwarded, a $Co_{90}Ni_{10}$ alloy layer forming a magnetic layer is deposited diagonally on the base B at the cooling can 87 in the oxygen atmosphere.

The above vacuum evaporation setup operates as follows: The vacuum chambers 81c and 81d are kept illustratively at a vacuum of $1 \times 10^{-4}$ Torr. The pipe 91 introduces the oxygen gas illustratively at a rate of 250 cc/min. into the vacuum chambers 81c and 81d. In this case, the incident angle of the evaporated metal relative to the base B is illustratively set between 45° ($\theta$ minimum) and 90° ($\theta$ maximum). The thickness of the magnetic layer is illustratively 2,000 angstrom units. The subsequent steps of making the eight-millimeter format magnetic tape are the same as with the first method.

According to the inventors' measurements, the magnetic tape ultimately produced by the above process has a residual magnetic flux density ($B_r$) of 3,900 G, a coercive force $H_c$ of 1,420 Oe, and a squareness $R_s$ of 78%. The surface roughness of the magnetic tape has a center line average height $R_a$ of as small as 20 angstrom units, reflecting the surface roughness of the base B. The energy product in the above case is given as $$B_r \cdot \delta \cdot H_c = 110.76 G \cdot cm \cdot Oe$$

According to the fourth method for manufacturing the magnetic tape, one $Co_{95}Ni_5$ alloy layer forming a magnetic layer is illustratively deposited diagonally on the base B in the oxygen atmosphere using the device of FIG. 18 (same as the third method). In this case, diagonal deposition is carried out while the oxygen gas is being introduced into the vacuum chambers 81c and 81d illustratively at a rate of 220 cc/min. The incident angle of the evaporated metal relative to the base B is illustratively set between 50° ($\theta$ minimum) and 90° ($\theta$ maximum). The thickness of the magnetic layer is illustratively 2,000 angstrom units. The subsequent steps of making the eight-millimeter format magnetic tape are the same as with the first method.

According to the inventors' measurements, the magnetic tape ultimately produced by the above process has a residual magnetic flux density ($B_r$) of 4,160 G, a coercive force $H_c$ of 1,690 Oe, and a squareness $R_s$ of 77%. The surface roughness $R_a$ of the magnetic tape is 20 angstrom units. The energy product in the above case is given as $$B_r \cdot \delta \cdot H_c = 140.6 G \cdot cm \cdot Oe$$

Where the magnetic tape manufactured by any of the above-described four methods is used, the bit error rate of the reproduction output prior to error correction is reduced to $1 \times 10^{-4}$ or less.

Magnetic tapes manufactured in the manner described are then used for transfer of magnetic recordings from one tape to another. Such transfer takes place as depicted in FIG. 1.

Figures 19, 19A:
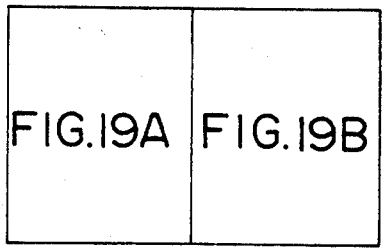

FIG. 19 shows how FIGS. 19A and 19B fit together. These Figures tabulate typical transfer output measurements taken of copy tapes in diverse sample combinations with mother tapes, the combinations varying in magnetic layer material, film structure and other tape-related factors. In any of the sample combinations listed in FIGS. 19A and 19B, the magnetic layer was formed by diagonally depositing it on the base at an incident angle between 40° ($\theta$ minimum) and 90° ($\theta$ maximum). In the "Film Structure" column of FIGS. 19A and 19B, a "single layer" entry means that the magnetic layer is made of one magnetic metal thin film; a "double layer" entry means that the magnetic layer is made of two magnetic metal thin films deposited one on top of the other.

As indicated in FIGS. 19A and 19B, the sample combinations 5 through 11 were found to have their coercive force ratios $H_{cm}/H_{cc}$ set to 1.5 or less and their copy tape transfer outputs to 2.1 through 6.8 dB. These measurements are significantly high vales. Where the recording wave length was shortened to about 0.5 $\mu$m, the copy tape transfer outputs were still sufficiently high in practical terms.

With the comparative sample combination shown in FIGS. 19A and 19B, the mother tape M has the magnetic layer composition of 100% Co, and the copy tape C is a metal-coated Ba-F tape. The coercive force $H_{cc}$ and residual magnetic flux density $B_r$ of the Ba-F tape correspond to $H_{c1}$ and $B_{r1}$, respectively.

Figure 20:
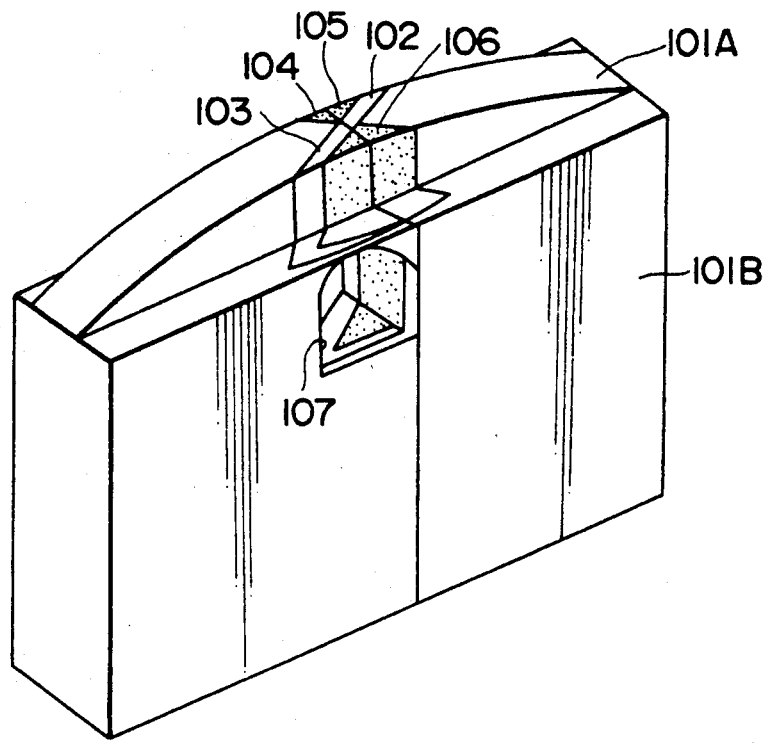
FIG. 20 is a perspective view of a typical magnetic head structure for use with the invention.
Figure 21:
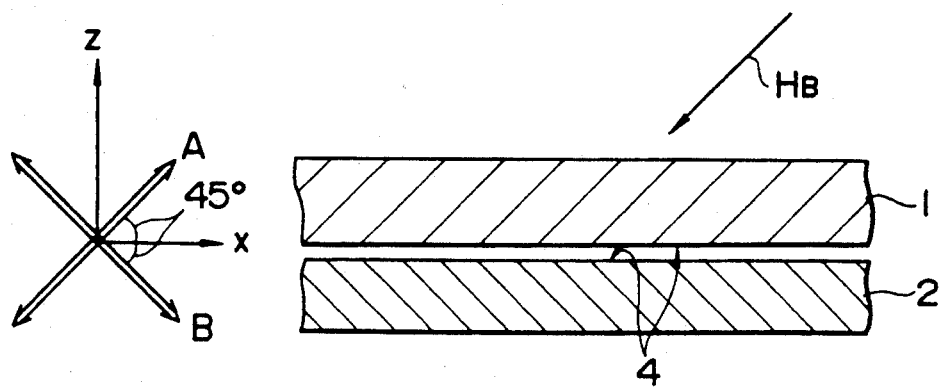
FIG. 21 is a schematic cross-sectional view of how the prior art magnetic recording transfer method is typically implemented.

FIG. 20 illustrates a typical magnetic head for use with the present invention. As depicted, the magnetic head has Fe-Ga-Si-Ru soft magnetic layers 102 and 103 formed by sputtering on monocrystal Mn-Zn ferrite cores 101A and 101B, the layers 102 and 103 forming a gap 104 therebetween. Both sides of the gap 104 in the track width direction are filled with glasses 105 and 106 which limit the track width illustratively to about 4 $\mu$m. Numeral 107 is a winding hole into which to place a recording coil, not shown. The effective gap length of this magnetic head is 0.20 $\mu$m.

The Fe-Ga-Si-Ru soft magnetic layers 102 and 103 having a saturation magnetic flux density $B_s$ of 14.5 kG are located close to the gap 104. This makes it possible for the magnetic head to transfer magnetic recordings onto a magnetic tape of high coercive force without causing magnetic saturation within the head.

With the above-described ME tapes and magnetic head in use, recording densities of at least 1.25 $\mu m^2$ per bit are achieved.

The recording density of 1.25 $\mu m^2$ per bit is obtained by recording signals of the shortest wave length of 0.5 $\mu$m onto tracks 5 $\mu$m wide. Meanwhile, it is known that the C/N ratio of the reproduced output increasingly deteriorates as the recording wave length and track width are being reduced. It is to minimize such deterioration that the tapes and head discussed above are utilized.

In 1988, this applicant made a digital VTR on a trial basis by use of eight-millimeter format ME tapes at a track pitch of 15 μm and with the shortest wave length of 0.5 μm. In that trial digital VTR system, a rotary drum 40 mm in diameter was rotated at 60 rpm for recording and reproduction. In experiments, this system provided a C/N ratio of 51 dB for a recording wave length of 1 μm and a bit error rate of $4 \times 10^{-5}$.

If the above system were to use tracks 5 μm wide as in this embodiment, the resulting C/N ratio would be only about 44 dB, given the same specifications. The deterioration of 7 dB in C/N ratio is supplemented by the above-described embodiment of the invention.

As the spacing between the magnetic head and the tape widens during recording or reproduction, the signal output level is known to drop. The amount of the spacing is known to be dependent on the levelness of the tape being used. The levelness of the coated type tape depends on the coat, whereas the levelness of the ME tape is dependent on the surface levelness of its base. In experiments with the above embodiment, the C/N ratio was found to increase by 1 dB when the surface roughness of the base film was minimized. Where the above-mentioned materials and methods of vacuum evaporation were applied to the magnetic tapes that the applicant used on his trial system of 1988, an improvement of 3 dB in C/N was obtained. This means that an overall improvement of 4 dB in C/N was obtained over the previously manufactured trial system through the use of the present invention.

As described, this embodiment of the invention uses the Viterbi decoder for channel decoding. In experiments, this arrangement was found to yield an improvement of 3 dB in C/N over the bit-by-bit decoding scheme employed by the preceding trial system.

As a result, the deterioration of 7 dB in C/N is supplemented in total by the above-described measures. That is, with its recording density of 1.25 μm² per bit, the embodiment provides the same bit error rate as the trial system of 1988. The bit error rate prior to correction by error correction codes needs to be $10^{-4}$ or lower because of the necessity to contain errors within a correctable amount when error correction codes with a redundancy of about 20% are used.

As many apparently different embodiments of this invention may be made without departing from the spirit and scope thereof, it is to be understood that the invention is not limited to the specific embodiments thereof except as defined in the appended claims.

What is claimed is:

1. A magnetic recording transfer method for use with the combination of a mother magnetic recording medium and a copy magnetic recording medium of a metal-deposited thin film type each comprising the steps of, overlaying said mother and copy magnetic mediums with the easy axis of said mother magnetic medium being at an angle of 20 degrees plus or minus 15 degrees relative to the forward movement planar direction of said mother magnetic medium, so that the column inclination of one medium will be opposite in direction to that of the other medium, applying an externally biased magnetic field to said mother and copy magnetic mediums at an angle of 110 degrees plus or minus 15 degrees relative to the forward movement planar direction of said mother magnetic medium and transferring magnetized recordings on said mother magnetic recording medium to said copy magnetic recording medium.

2. A magnetic recording transfer method according to claim 1, including the step of selecting the ratio of the coercive force Hcc of said mother magnetic recording medium to the coercive force Hcc of said copy magnetic recording medium so that it satisfies the condition of $Hcm/Hcc \leq 1.5$.

3. A magnetic recording transfer method according to claim 1 including the further step of selecting the magnetic flux density Br of said mother magnetic recording medium to be at least 4,000 G.

4. A magnetic recording transfer method according to claim 1, including the further step of selecting the total magnetic flux quantity Br·δ of said mother magnetic medium to be at least 0.08 G·cm.

5. A magnetic recording transfer method according to claim 1, including the further step of selecting the coercive force Hc of said mother magnetic medium to be at least 1,300 Oe.

6. A magnetic recording transfer method according to claim 1, including the further step of selecting the magnetic flux density Br of said copy magnetic medium to be at least 2,500 G.

7. A magnetic recording transfer method according to claim 1, including the further step of selecting the total magnetic flux quantity Br·δ of said copy magnetic recording medium to be at least 0.05 G·cm.

8. A magnetic recording transfer method according to claim 1, including the further step of selecting the coercive force Hc of said copy magnetic recording medium to be within the range of $800 \text{ Oe} \leq Hc \leq 1,800$ Oe.

9. A method for magnetically recording digital video signals, said method comprising the steps of converting input digital video signals into blocks each made up of a plurality of pixel data, compression-coding said blocks of pixel data block by block, converting said compression-coded data into channel-encoded data, recording said channel-encoded data onto a magnetic recording media with magnetic heads, selecting said magnetic recording media to be a nonmagnetic base which is overlaid by a magnetic layer made of a magnetic metal thin film, selecting said magnetic layer so that it has an energy product of at least 100 G·cm·Oe obtained by multiplying the residual magnetic flux density with the thickness and the coercive force of said magnetic layer, and wherein said magnetic recording media are each constituted by a nonmagnetic base overlaid with a magnetic layer made of a magnetic metal thin film, said magnetic recording media being composed of a mother medium and a copy medium, the magnetic layer of said mother medium being brought to close proximity of the magnetic layer of said copy medium in such a manner that the inclination of columns on the magnetic layer of said mother medium is opposite in direction to that of said copy medium, the easy axis of said mother medium being positioned at $20° \pm 15°$ with respect to the in-plane direction of said mother medium, the magnetic recordings on said mother medium being transferred onto said copy medium by externally applying a biased magnetic field to said mother medium substantially at $110° \pm 15°$ relative to said in-plane direction.

10. A method of magnetically recording digital video signals according to claim 9 including the further step of selecting said magnetic metal thin film to be a single layer.

11. A method of magnetically recording digital video signals according to claim 9, including the further step of selecting said magnetic metal thin film to be a double layer.

12. A method for magnetically recording digital video signals comprising the steps of, forming mother and copy magnetic recording mediums by overlaying nonmagnetic bases with magnetic layers made of magnetic metal thin film, placing said magnetic layer of said mother medium close to the magnetic layer of said copy medium with the inclination of the columns on the magnetic layer of said mother medium in the opposite direction to that of said copy medium, selecting the easy axis of said mother medium at an angle of 20 degrees plus or minus 15 degrees with respect to the forward movement planar direction of said mother medium, applying a magnetic field to said mother medium at an angle of 110 degrees plus or minus 15 degrees with respect to the forward movement direction of said mother magnetic medium, and transferring magnetic recordings from said mother magnetic medium to said copy magnetic medium.

13. A method of magnetically recording digital video signals according to claim 12 comprising the further step of selecting the ratio of the coercive force Hcm of said mother magnetic recording medium to the coercive force Hcc of said copy magnetic recording medium to be $$Hcm/Hcc \leq 1.5.$$

* * * * *